United States Patent [19]

Ueno et al.

[11] Patent Number: 5,107,256
[45] Date of Patent: Apr. 21, 1992

[54] METHOD AND APPARATUS FOR CONTROLLING TERMINALS ON COMMUNICATION NETWORK

[75] Inventors: Reiko Ueno, Neyagawa; Naoyoshi Nakamae, Kadoma; Masao Ikezaki, Hirakata; Hiromasa Nakatsu, Osaka, all of Japan

[73] Assignee: Matsushita Electric Industrial Co., Ltd., Osaka, Japan

[21] Appl. No.: 264,071

[22] Filed: Oct. 28, 1988

[30] Foreign Application Priority Data

Nov. 2, 1987 [JP]  Japan .................. 62-277646
Jun. 10, 1988 [JP]  Japan .................. 63-144257

[51] Int. Cl.$^5$ ............................ H04B 3/00
[52] U.S. Cl. ................ 340/825.52; 340/825.07; 358/86
[58] Field of Search ......... 340/825.52, 825.07, 340/815.21, 825.05, 825.08, 825.5; 358/86, 194.1; 455/5, 4; 364/200 MS File; 370/85.9, 85.13, 92, 93, 94.1

[56] References Cited

U.S. PATENT DOCUMENTS

| 4,343,042 | 8/1982 | Schrock et al. ................. 455/5 |
| 4,633,247 | 12/1986 | Hegeler ...................... 340/825.52 |
| 4,716,410 | 12/1987 | Nozaki ....................... 340/825.52 |
| 4,733,224 | 3/1988 | Kimura ....................... 340/825.07 |
| 4,910,655 | 4/1990 | Ashkin ....................... 340/825.07 |

FOREIGN PATENT DOCUMENTS 0217571  4/1987  European Pat. Off. .

OTHER PUBLICATIONS

M. Inoue et al., "A Home Automation System", IEEE Transactions on Consumer Electronics, vol. CE-31, No. 3, pp. 516-525, Aug. 1985.

An Examination Report of Home Bus System Standard Specification, EIAJ/Radio Wave Corporate Home Bus System Standard Committee, pp. 18, 54, 59, 69, 93 and 117, Feb. 1987.

Primary Examiner—Donald J. Yusko
Assistant Examiner—Dervis Magistre
Attorney, Agent, or Firm—Stevens, Davis, Miller & Mosher

[57] ABSTRACT

A plurality of terminals on a communication network are connectable to a transmission line to communicate mutually. Each terminal includes a single device or a composite device essentially consisting of a plurality of devices. Transmissions and reception of messages to and from the plurality of terminals on the communication network is performed using an address system assigned to each terminal. The address system comprises a device address or DA assigned to the individual terminals, a sub-device address or SDA assigned to respective devices constituting each terminal and having a single or a plurality of values SDA, and a function address or FA assigned to respective functions possessed by each device and having a single or a plurality of values of FA, whereby even when a terminal to be controlled is a composite device, only a function desired to be controlled can readily be controlled and extensibility of the system can be improved to facilitate control processing in the system through communication.

3 Claims, 31 Drawing Sheets

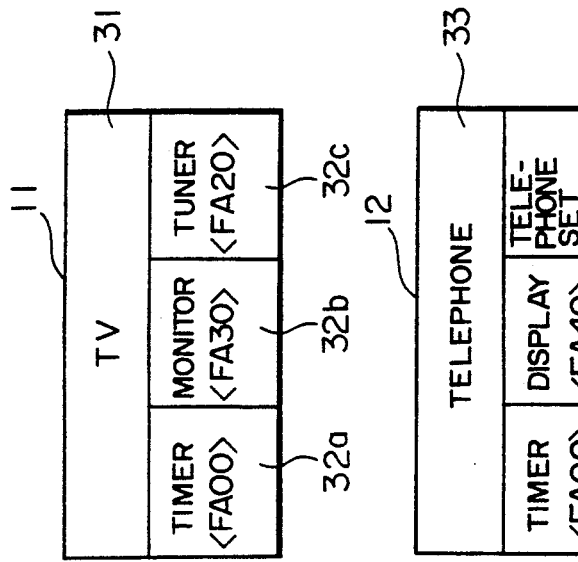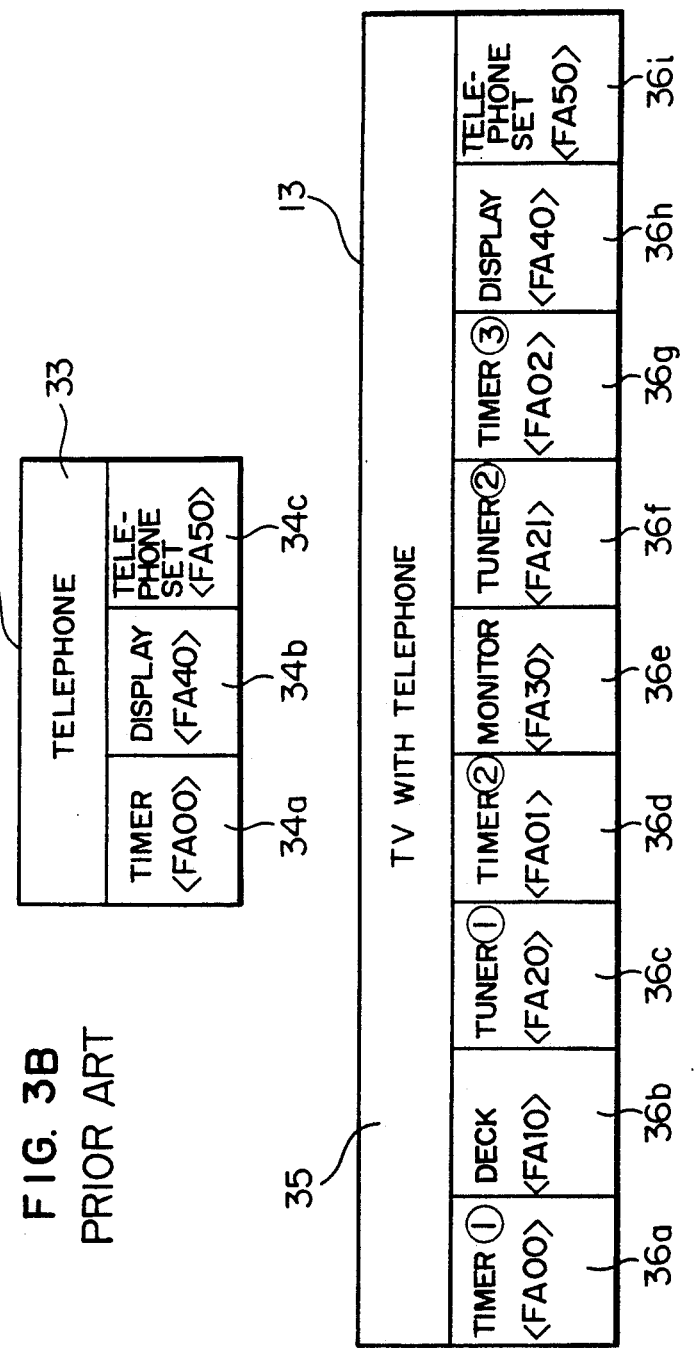
FIG. 3A PRIOR ART
FIG. 3B PRIOR ART
FIG. 3C PRIOR ART

FIG. 4
PRIOR ART

| COORDI-NATES | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | FA FOR TIMER | | | | | | | | | | | | | | | |
| 1 | FA FOR DECK | | | | | | | | | | | | | | | |
| 2 | FA FOR TUNER | | | | | | | | | | | | | | | |
| 3 | FA FOR MONITOR | | | | | | | | | | | | | | | |
| 4 | FA FOR DISPLAY | | | | | | | | | | | | | | | |
| 5 | FA FOR TELE-PHONE SET | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

Labels: 41, 42, 43, 44, 45, 46

FIG. 12A PRIOR ART
ADDRESS MANAGEMENT TABLE FOR TERMINAL SUBJECT TO TIMER CONTROL PROCESSING

| | 121a | 122a | 123c |
|---|---|---|---|
| TV ⟨DA11⟩ | ⟨FA00⟩ | | |
| TELEPHONE ⟨DA12⟩ | | ⟨FA00⟩ | |
| TV WITH TELEPHONE ⟨DA13⟩ | | | ⟨FA00⟩ ⟨FA01⟩ ⟨FA02⟩ |

121, 122, 123 (123a, 123b, 123c)

FIG. 12B PRIOR ART
ADDRESS MANAGEMENT TABLE FOR TERMINAL SUBJECT TO TV TIMER CONTROL PROCESSING

| | 124a | 125a |
|---|---|---|
| TV ⟨DA11⟩ | ⟨FA00⟩ | |
| TV WITH TELEPHONE ⟨DA13⟩ | | ⟨FA01⟩ |

124, 125

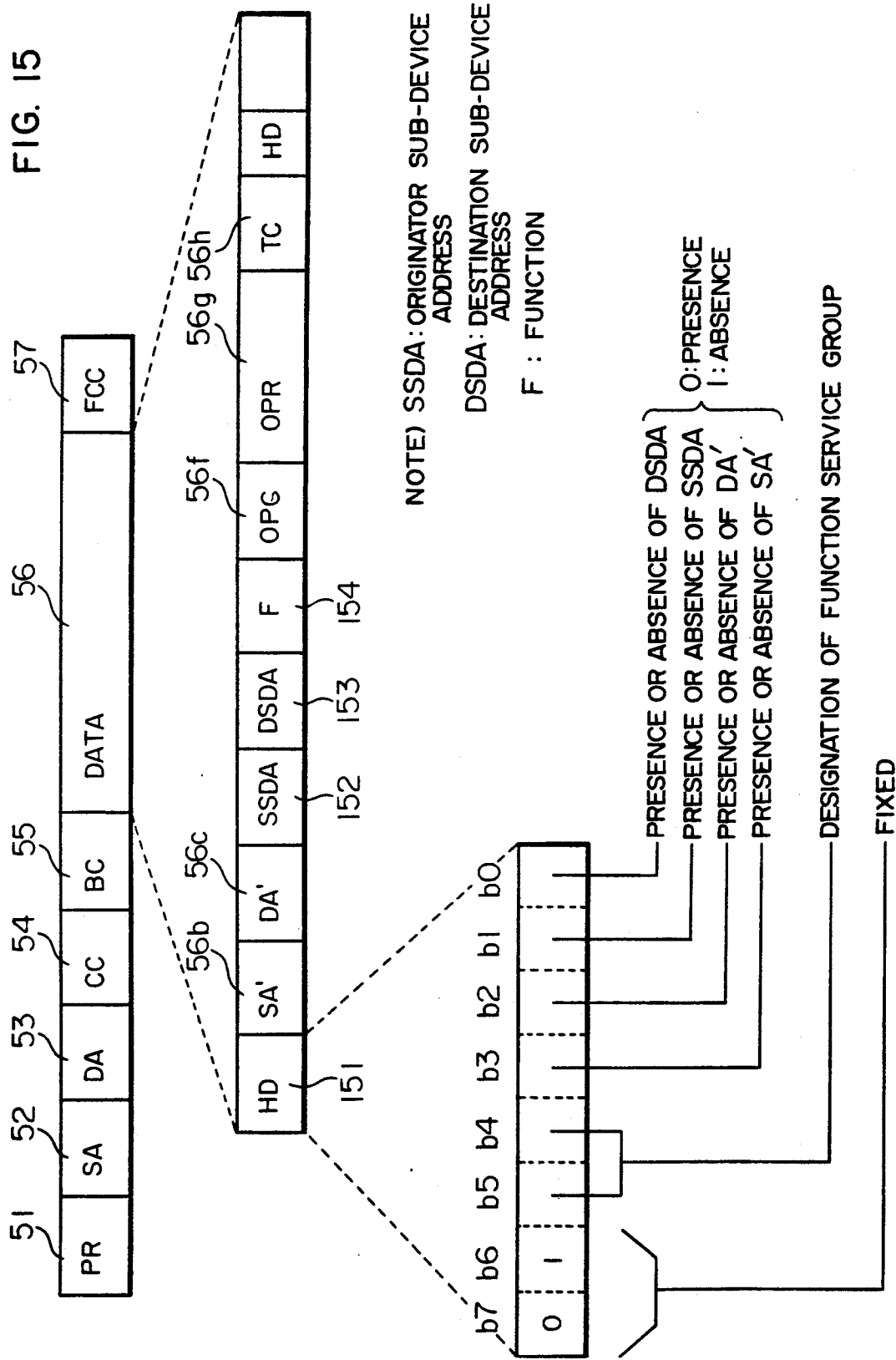

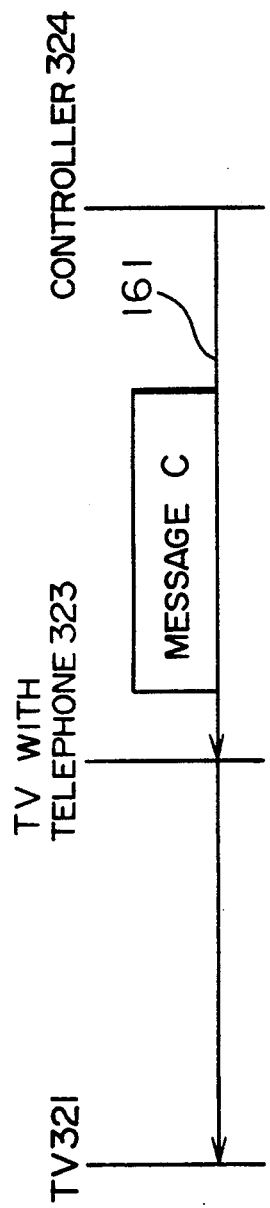

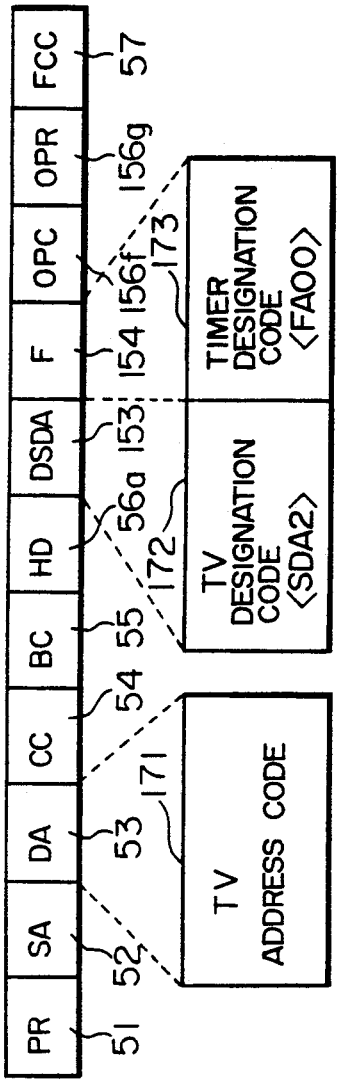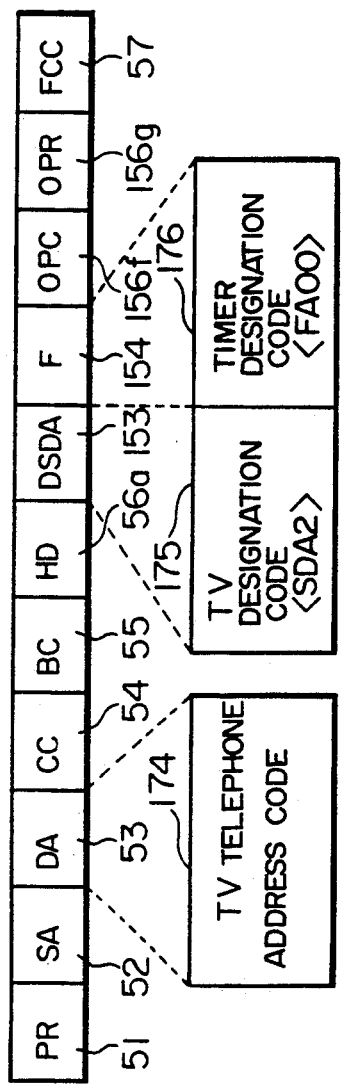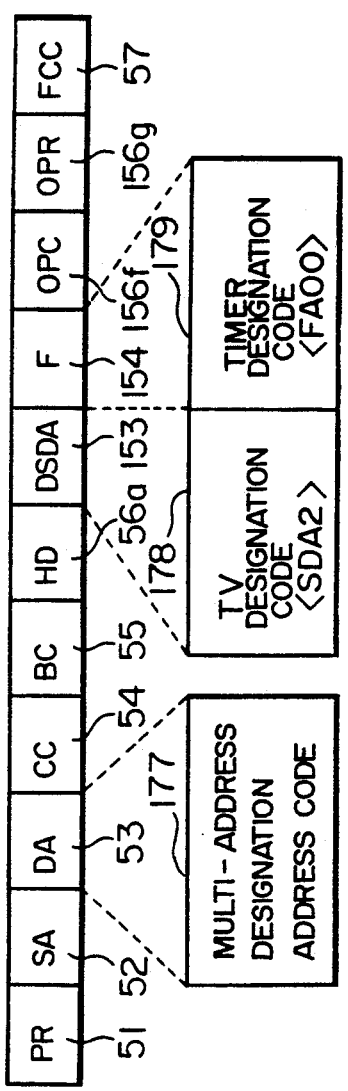

FIG. 22

| NO. | NAME OF COMMAND | OPERATION CODE (HEX) | CONTENTS OF OPERAND (CONSTRUCTION) |
|---|---|---|---|
| 221 | SUB-DEVICE ADDRESS REQUEST | F0 | |
| 222 | SUB-DEVICE ADDRESS RESPONSE | F1 | POSSESSED SUB-DEVICE ADDRESS CODE (n Byte) |
| 223 | FUNCTION REQUEST | F2 | DESIGNATED SUB-DEVICE ADDRESS CODE (1 Byte) |
| 224 | FUNCTION RESPONSE | F3 | DESIGNATED SUB-DEVICE CODE (1 Byte) / FUNCTION CODE POSSESSED BY DESIGNATED SUB-DEVICE (n Byte) |

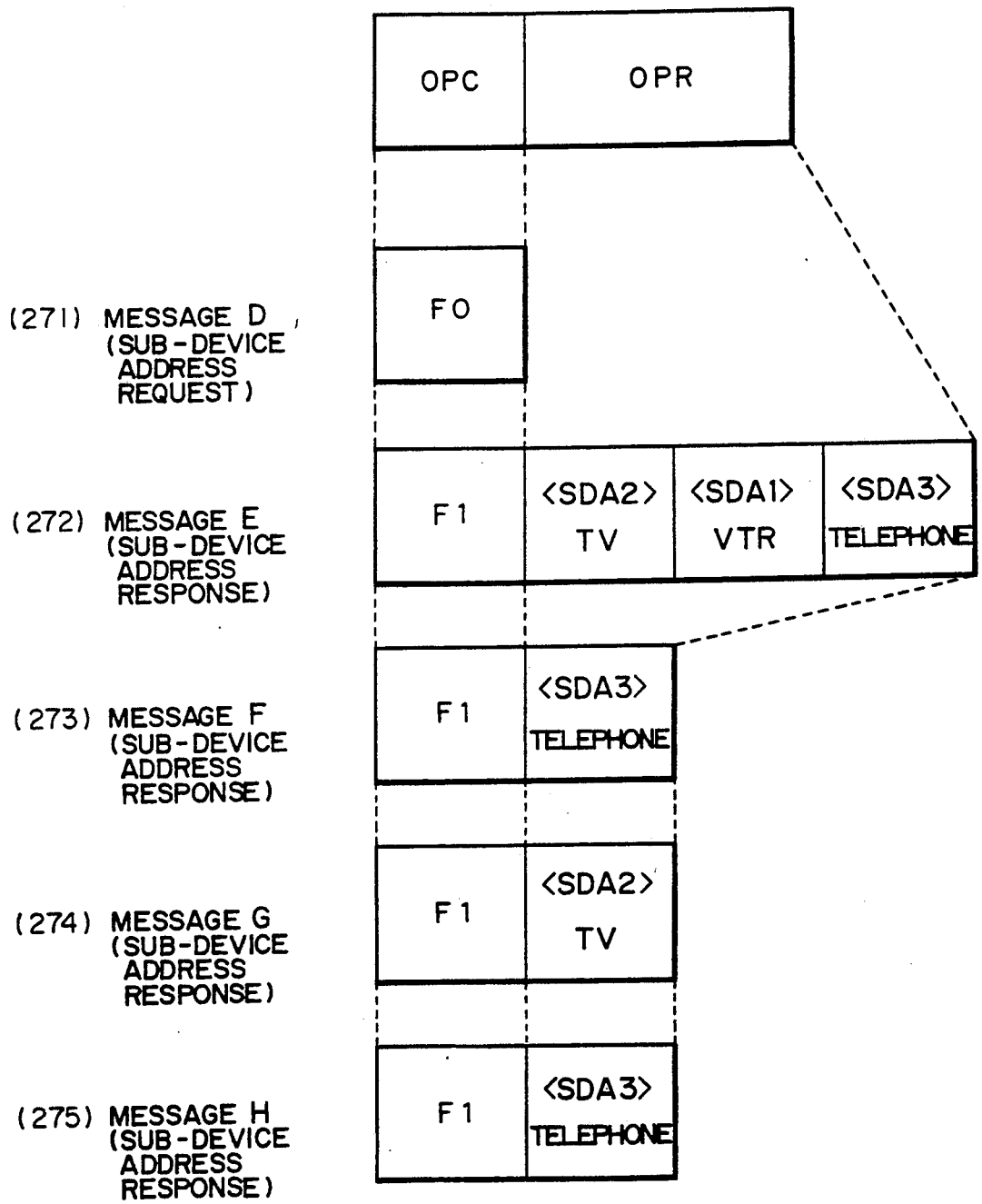

METHOD AND APPARATUS FOR CONTROLLING TERMINALS ON COMMUNICATION NETWORK

BACKGROUND OF THE INVENTION

This invention relates to a method and an apparatus for controlling terminals on a communication network, especially, a terminal control method featuring a unique address system used for transmission and reception of messages to and from terminals on a communication network.

FIG. 1 is a schematic diagram illustrating a communication network to which a transmission system of the invention is applied;

FIG. 2 illustrates a prior art address system for various devices;

FIGS. 3A, 3B and 3C illustrate examples in which the prior art address system is applied to various devices shown in FIG. 1;

FIG. 4 shows allotment in a function address table based on the prior art address system;

FIG. 5 illustrates a format of a prior art control message on a home bus system control channel;

FIG. 6 illustrates an example of the sequence for controlling the devices having the address formats shown in FIG. 3;

FIGS. 7A and 7B illustrate examples of the message format used in the sequence shown in FIG. 6;

FIG. 8 is a schematic diagram illustrating a prior art received message processor for a TV;

FIG. 9 is a schematic diagram illustrating a prior art received message processor of telephone;

FIG. 10 is a schematic diagram illustrating a prior art received message processor of TV with telephone;

FIG. 11 is a schematic diagram illustrating a prior art controller; and

FIGS. 12A and 12B illustrate examples of address management table for devices to be managed which are used in the prior art controller.

The prior art will now be described referring to FIGS. 1 to 12. As shown in FIG. 1, a plurality of terminals 11 to 14 are connected to a transmission line 10 to communicate mutually in a communication network, and each terminal comprises a single device or a composite device consisting of a plurality of devices. Conventionally, an address system necessary for transmission and reception of messages to and from the terminals is designed, as shown in FIG. 2, to include a device address (DA) 21 assigned to individual terminals and function addresses (FA's) 22 respectively assigned to functions of each terminal. A value of the FA represents predetermined contents and a table as shown in FIG. 4 is constructed. According to the table of FIG. 4, a FA for timer 41, for example, has specific values <FAxy>. Thus, the timer FA 41 has four values <FA00> to <FA03> and these values are effective to identify a plurality of timers possessed by a terminal comprising a composite device to be described later. According to this address system, the TV11, telephone 12 and TV with telephone 13 have address formats as shown in FIG. 3. More particularly, the TV 11 has a TV 31 as a DA and a FA having specific values of a timer 32a (<FA00>), a monitor 32b (<FA30>) and a tuner 32C (<FA20>). The telephone 12 has a telephone 33 as a DA and a FA having specific values of a timer 34a (<FA00>), a display 34b (<FA40>) and a telephone set 34C (<FA50>).

The TV with telephone 13 standing for a composite device having integral VTR, telephone set and TV has a TV with telephone 35 as a DA and a FA having specific values of a timer for VTR or timer ① 36a (<FA00>), a deck for VTR 36b (<FA10>), a tuner for VTR or tuner ① 36c ((<FA20>), a timer for TV or timer ② 36d (<FA01>), a monitor for TV 36e (<FA30>), a tuner for TV or tuner ② 36f (<FA21>), a timer for telephone or timer ③ 36g (<FA20>), a display for telephone 36h (<FA40>) and a telephone set for telephone 36i (<FA50>). There exist in the TV with telephone 13 three timers (timer ① 36a, timer ② 36d and timer ③ 36g) and two tuners (tuner ① 36c and tuner ② 36f) as viewed from outside but information concerning which device the FA is destined for is not added. Therefore, the controller 14 for controlling the terminals connected to the system has to be stored precedently with data for the controllable terminals upon establishment of the system. Conventionally, the controller 14 is constructed as exemplified in FIG. 11. The controller 14 comprises a transmission/reception control processor 111 responsive to a request for control to perform transmission/reception control of a message in accordance with the communication scheme on the transmission line, a received message control processor 113 which performs analysis of a FA and the like of a received message to decide whether the received message is a message to be processed, a control input unit 115 for inputting a request for system control and the like, a display unit 116 for displaying outputs such as control results, a system control processing unit 114 adapted to control the controller 14 and manage and control the system, a connectable terminal address information holding unit 117 operable to control and manage the system, and a transmission message control processing unit 112 responsive to information from the system control processing unit 114 to control transmission of message.

As an example, consider a case where the controller 14 changes, pursuant to sequence as shown in FIG. 6, setting of timer in order to effect time correction for TV in the system which is a home bus system using a control message as shown in FIG. 5 for controlling terminals. It will be appreciated from FIGS. 1 and 3 that two terminals, TV 11 and TV with telephone 13, have a timer for TV. Upon start-up of the system, it is necessary for the connectable terminal address information holding unit 117 of controller 14 to hold in advance the following information:

(I) Information about the value of DA 31 of the TV 11 and the value (<FA00>) of the timer FA 32a.

(II) Information about the value of DA 35 of the TV with telephone 13 and the value (<FA01>) of the timer ② FA 36d. In the controller 14, the connectable terminal address information holding unit 114 holds the above information as a table shown at (12B) in FIG. 12. Referring to FIG. 5, the message on a home bus control channel as shown in FIG. 6 has a format including a priority code PR 51 for determining priority of communications on the transmission line, a field SA 52 indicative of an address of an originator, a field DA 53 indicative of an address of a destination, a field CC 54 of a message control code indicative of the kind of information in a DATA field 56 containing the contents of the message, a DATA field length code BC 55 indicative of the size of the DATA field 56, and a frame check code FCC 57 used to effect frame check of the message by utilizing two's complement of the sum of the bits ranging from SA 52 to the final byte of DATA 56. To detail the DATA field 56, it has a sub-bus originator address SA' 56b indicative of an originator address in the event that a message is issued from a terminal connected to a different transmission line, a destination address DA' 56c indicative of a destination address in the event that a message is destined for a terminal connected to a different transmission online, an originator function address SFA 56d indicative of an originator (FA) in the originator terminal, a destination function address DFA 56e indicative of a destination (FA) in the destination terminal, an operation code OPC 56f for designating a command for control, an operand code OPR 56g for designating details of the contents of the control command, a termination code TC 56h, and a header HD 56a having information for designating the presence or absence of the SFA 56d, DFA 56e, DA' 56c and SA' 56b and a table (service group) of the command designated by the OPC 56f.

In the controller 14, when a request for the simultaneous change of timers for TV in the system is input from the control input unit 115, the system processing unit 114 determines the inputted request, builds up a transmission message A as shown at (7-1) in FIG. 7 destined for the TV 11 on the basis of a management table as shown at (12-2) in FIG. 12 stored in the connectable terminal address information holding unit 117, and transfers the message A to the transmission message control processing unit 112. At that time, in the message A, a field DA 53 indicates a code 71 indicative of a DA of the TV 11 and a field DFA 56e indicates a code 72, <FA00>, indicative of a FA of the timer 32a. The transmission message control processing unit 112 then performs a transmission processing of the message A sent from the system control processing unit 114 and transmits the message to the TV 11 through the transmission/reception control processor 111, as indicated at 61 in FIG. 6.

In the TV 11 constructed as shown in FIG. 8, a transmission/reception control processor 81 receives the message A and a DFA decision processing unit 83 of a received message control processor 82 decides the field DFA. Since the DFA in this message A indicates the timer code 72 <FA00>, the DFA decision processing unit 83 actuates a timer <FA00> destined message control processing unit 85 to carry out a processing of change of timer. Subsequently, the controller 14 builds up a message B as shown at (7-2) in FIG. 7, as in the case of the message A, and transmits the message B to the TV with telephone 13, as indicated at 62 in FIG. 6. At that time, DA 53 of the message B indicates a code 73 indicative of a DA of the TV with telephone 13 and DFA 56e indicates a code 74<FA01>indicative of a FA of the TV timer 36d. In the TV with telephone 13 constructed as shown in FIG. 10, a transmission/reception control processor 101 receives the message B and a DFA decision processing unit 103 of a received message control processor 102 determines the DFA. Since the DFA in this message B indicates the timer ② code 74 <FA01>, the DFA decision processing unit 103 actuates a timer <FA01> destined message control processing unit 107 to carry out a processing of change of TV timer. In the prior art, the value of the message destined address DA 53 and the value of the code DFA 56e in the message A shown at (7-1) in FIG. 7 and the message B shown at (7-2) in FIG. 7 are different for terminals and therefore the TV 11 and TV with telephone 13 cannot be controlled simultaneously. This leads to such potential danger that transmission/reception of a plurality of messages occur between the messages A and B and concurrence of the messages A and B is lost. This disadvantage is especially serious when a plurality of terminals are desired to be controlled simultaneously in order to effect, for example, the time correction of timers. Further, in comparison with the received message control processor 82 of the TV 11 constructed as shown in FIG. 8 and a received message control processor 92 of the telephone 12 constructed as shown in FIG. 9 by comparing components 93 to 97 corresponding to components 83 to 87 of the TV 11, the received message control processor 102 of the TV with telephone 13 having additional function of VTR is differently constructed and has values of FA, different from those of the processing units of the TV 11 and telephone 12, in order to handle plural timers, destined for different locations i.e., timer ① 36a, timer ② 36d and timer ③ 36g shown in FIG. 3, so that alternation is required to permit the processor 102 to take the part of the processor 82 and 92.

As described above, the prior art has the following disadvantages:

(i) Even when it is preferable to control simultaneously functions which are the same for a plurality of terminals, different addresses are sometimes assigned to the same function in the individual terminals and consequently simultaneous control of transmission of control messages cannot be achieved using a multi-address message destined for the individual terminals. As a result, separate control data must be transmitted to each terminal, thus making the control processing in the communication system complicated and the number of devices to be controlled is increased to increase traffic.

(ii) In order to control a function of a terminal in the system, a control terminal (controller) has to hold, according to precedence, data of the internal construction of the controlled terminal. Accordingly, when a new terminal is connected to the system or an existing terminal is connected to the system or an existing terminal is removed, information registered in the controller must always be updated, in particular, information concerning the newly connected terminal must be registered and this degrades extensibility of the system.

(iii) When developing composite devices, the control processing units of devices constituting the existing terminal can not be utilized without alternation. This impairs the versatility of the control processing unit of the terminal.

SUMMARY OF THE INVENTION

A first object of this invention is to provide a communication method and apparatus capable of facilitating control processing of a plurality of terminals.

A second object of this invention is to provide a communication apparatus and method of high extensibility which can readily deal with the connection of a new terminal to the apparatus and removal of an existing terminal from the apparatus.

A third object of this invention is to facilitate the designing of construction and the development of composite devices.

According to the invention, to accomplish the above objects, an address system used for transmission/reception of messages between terminals connected on a communication network comprises a device address (DA) assigned to the individual terminals, a sub-device address (SDA) assigned to respective devices constituting each terminal, and a function address (FA) assigned to respective functions possessed by each device, and a command is provided which enables a communication means to collect the SDA and FA belonging to each DA, each terminal having the capability to process the command.

Thus, the present invention features a unique address system used for transmission and reception of messages to and from terminals connected on the communication network to ensure that even when a terminal to be controlled comprises a composite device, only a desired function can be controlled readily and that extensibility of the system can be improved to facilitate control processing through communications in the system.

BRIEF DESCRIPTION OF THE DRAWINGS

FIGS. 3A, 3B and 3C illustrate examples in which the prior art address system is applied to various devices shown in FIG. 1;

FIG. 4 shows allotment in a function address table based on the prior art address system;

FIGS. 12A and 12B illustrate examples of address management table for devices to be managed which are used in the prior art controller;

FIG. 15 illustrates a format of a control message on a control channel which is used when the invention is applied to the home bus system;

FIG. 16 illustrates an example of the sequence for controlling the terminals having the address formats shown in FIG. 14;

FIGS. 17A, 17B and 17C illustrate examples of message format according to the invention used in the sequence shown in FIGS. 6 and 16;

FIG. 22 illustrates an example of a command for control based on the address system of the invention;

FIG. 27 illustrates examples of a command format in messages used for execution of the sequence shown in FIG. 26;

DESCRIPTION OF THE PREFERRED EMBODIMENTS

The invention will now be described by way of example with reference to the accompanying drawings, particularly, FIGS. 13 to 30.

Figure 13:
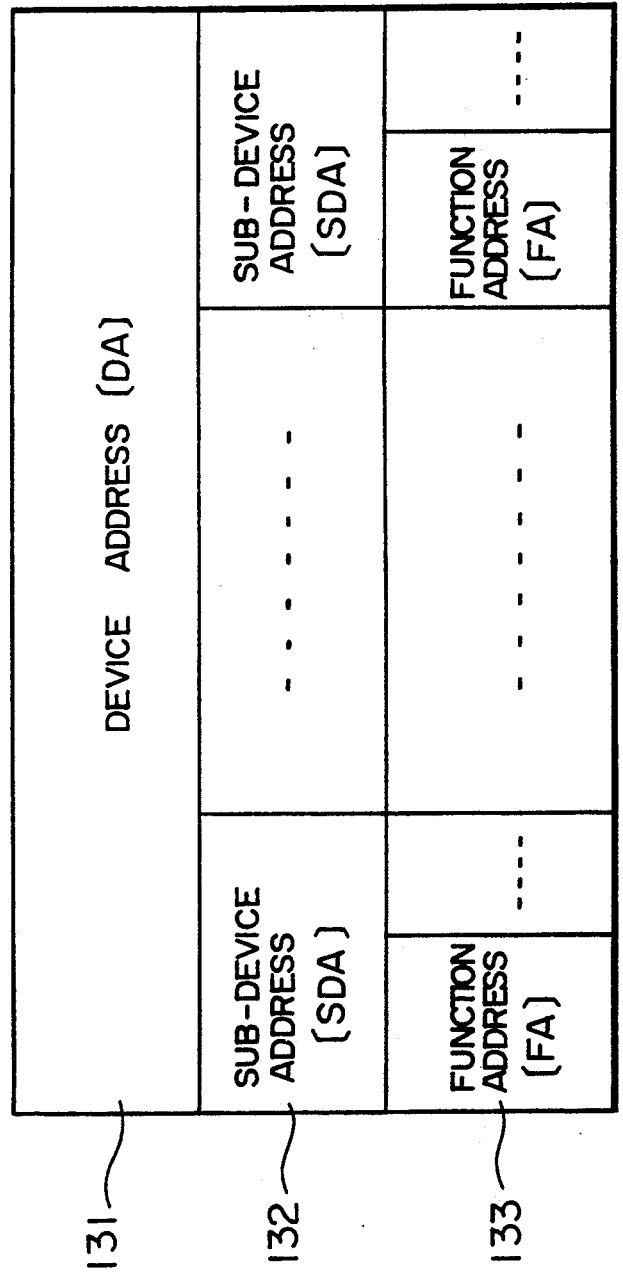
FIG. 13 is a diagram showing an address system for various terminals in accordance with the invention.
Figure 14A:
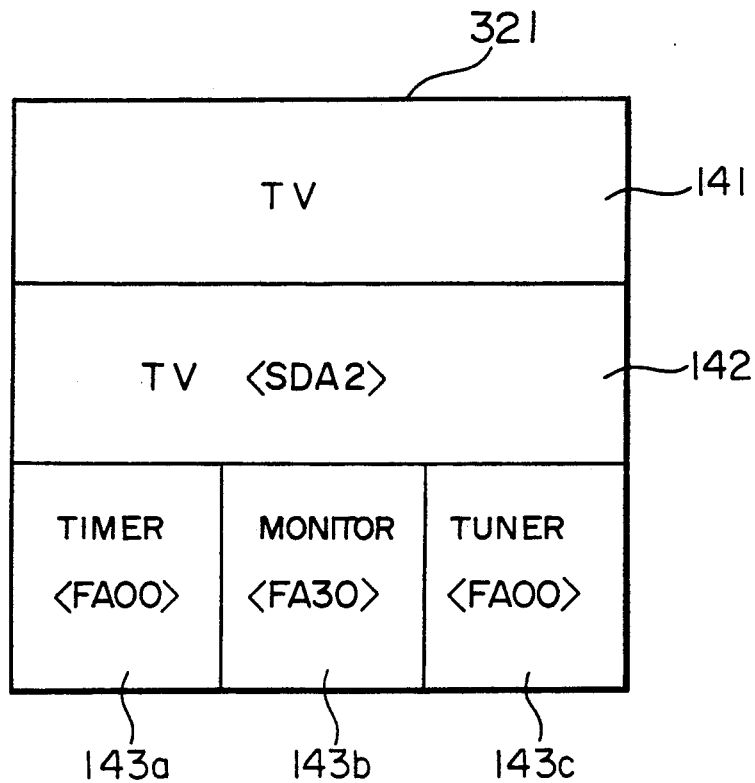
FIGS. 14A, 14B and 14C illustrate examples in which the address system according to the invention is applied to various terminals or devices shown in FIG. 3.
Figure 14B:
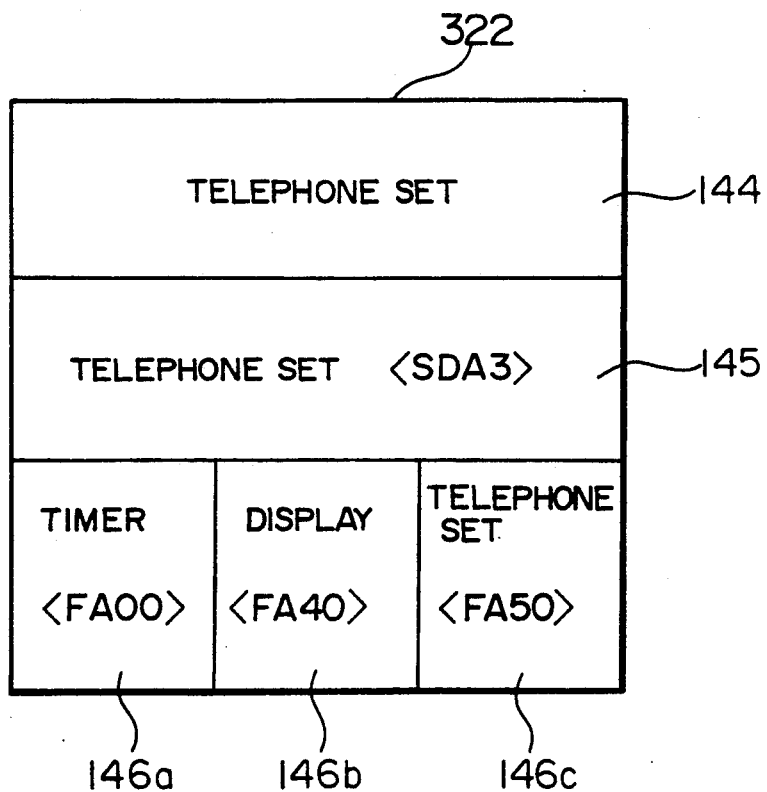
Figure 14C:
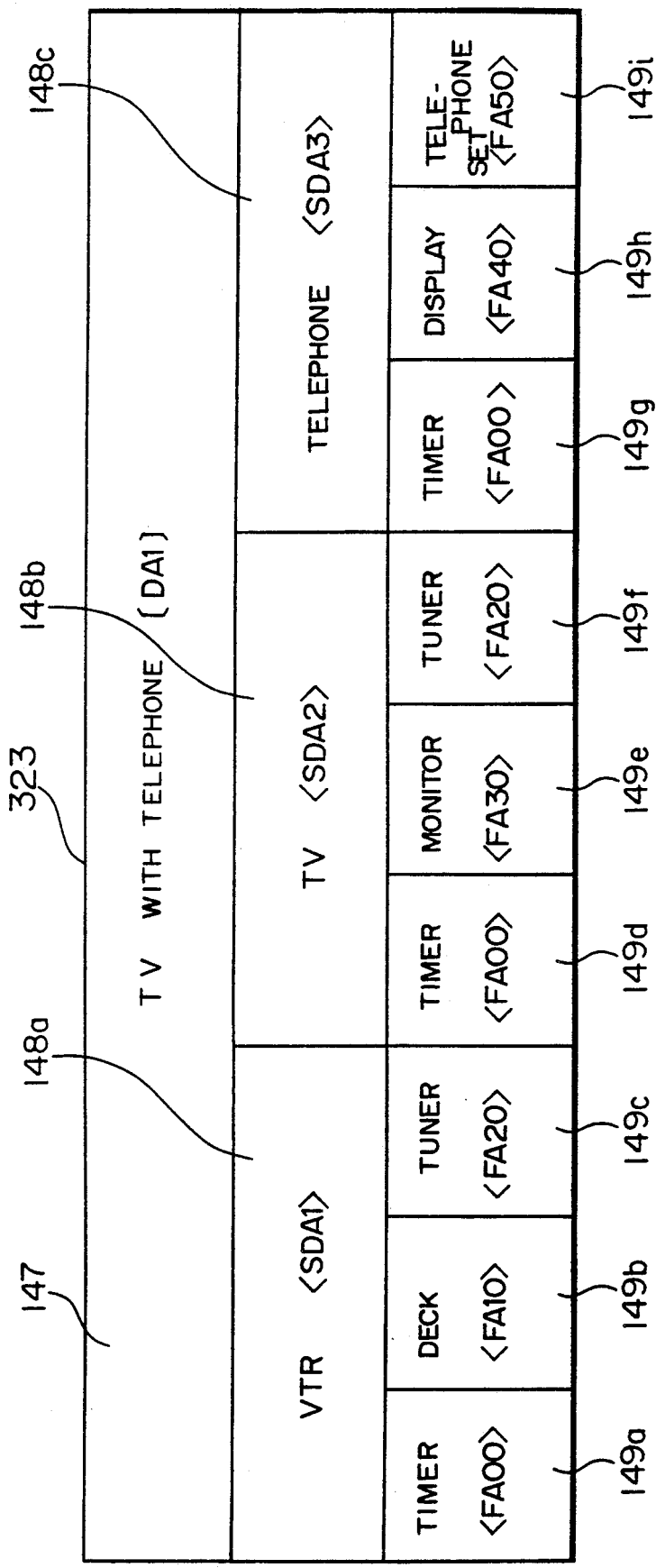
Figure 23:
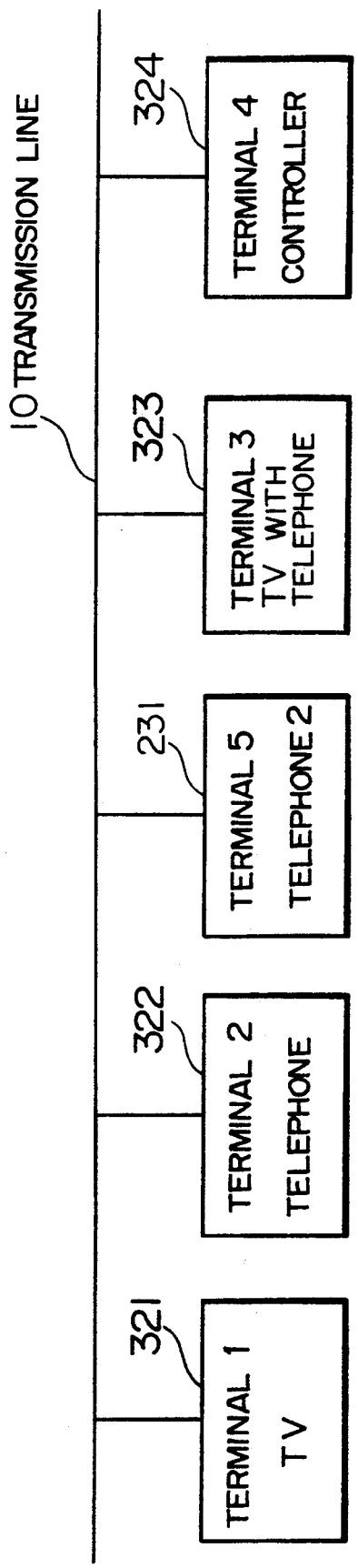
FIG. 23 is a schematic diagram illustrating a system in accordance with the invention.

As shown in FIG. 23, a plurality of terminals 321, 322, 231, 323 and 324 are connectable to a transmission line 10 to communicate mutually in a communication network, and each terminal comprises a single device or a composite device consisting of a plurality of devices. Referring to FIG. 13, an address apparatus and method for the terminal is respectively formatted in accordance with the invention to include a device address (hereinafter called DA) 131 assigned to the individual terminals and which is a physical address related to link establishment, a sub-device address (hereinafter called SDA) 132 assigned to respective devices constituting each terminal, and a function address (hereinafter called FA) 133 assigned to respective functions possessed by each device. Because the SDA 132 is intended to definitely designate a component of the device and the FA 133 is intended to definitely designate a function, the contents of each of the SDA and FA is definitely determined by a value and is related to the value through a table. According to the address method and apparatus of the present invention, addresses of the TV 321, telephone 322 and TV with telephone 323 are formatted as shown in FIGS. 14A, 14B and 14C respectively. The TV 321 has a TV 141 as a DA, a TV 142 as a SDA and a FA having values of a timer 143a (<FA00>), a monitor 143b (<FA30>) and a tuner 143c (<FA20>). The telephone 322 has a telephone set 144 as a DA, a telephone set 145 as a SAD and a FA having values of a timer 146a (<FA00>), a display 146b (<FA40>) and a telephone set 146c (<FA50>). The TV with telephone 323 standing for a composite device having integral VTR, telephone set and TV has a TV with telephone 147 as a DA, and a SDA having a VTR 148a as SDA1, a TV 148b as SDA2 and a telephone 148c as SDA3. The TV with telephone 323 has a FA of the following values. More specifically, a FA of the VTR 148a has values of a timer 149a (<FA00>), a deck 149b (<FA10>) and a tuner 149c (<FA20>), a FA of the TV 148b has values of a timer 149d (<FA00>), a monitor 149e (<FA30>) and a tuner 149f (<FA20>), and a FA of the telephone 148c has values of a timer 149g (<FA00>), a display 149h (<FA40>) and a telephone set 149i (<FA50>). When the invention is applied to the home bus system, the message (instruction codes) has a format as shown in FIG. 15 wherein the conventional SFA 56d is changed to an originator subdevice address (hereinafter called SSDA) 152, the conventional DFA 56e is changed to a destination subdevice address (hereinafter called DSDA) 153, and a destination function (F) 154 is newly added.

Figure 18:
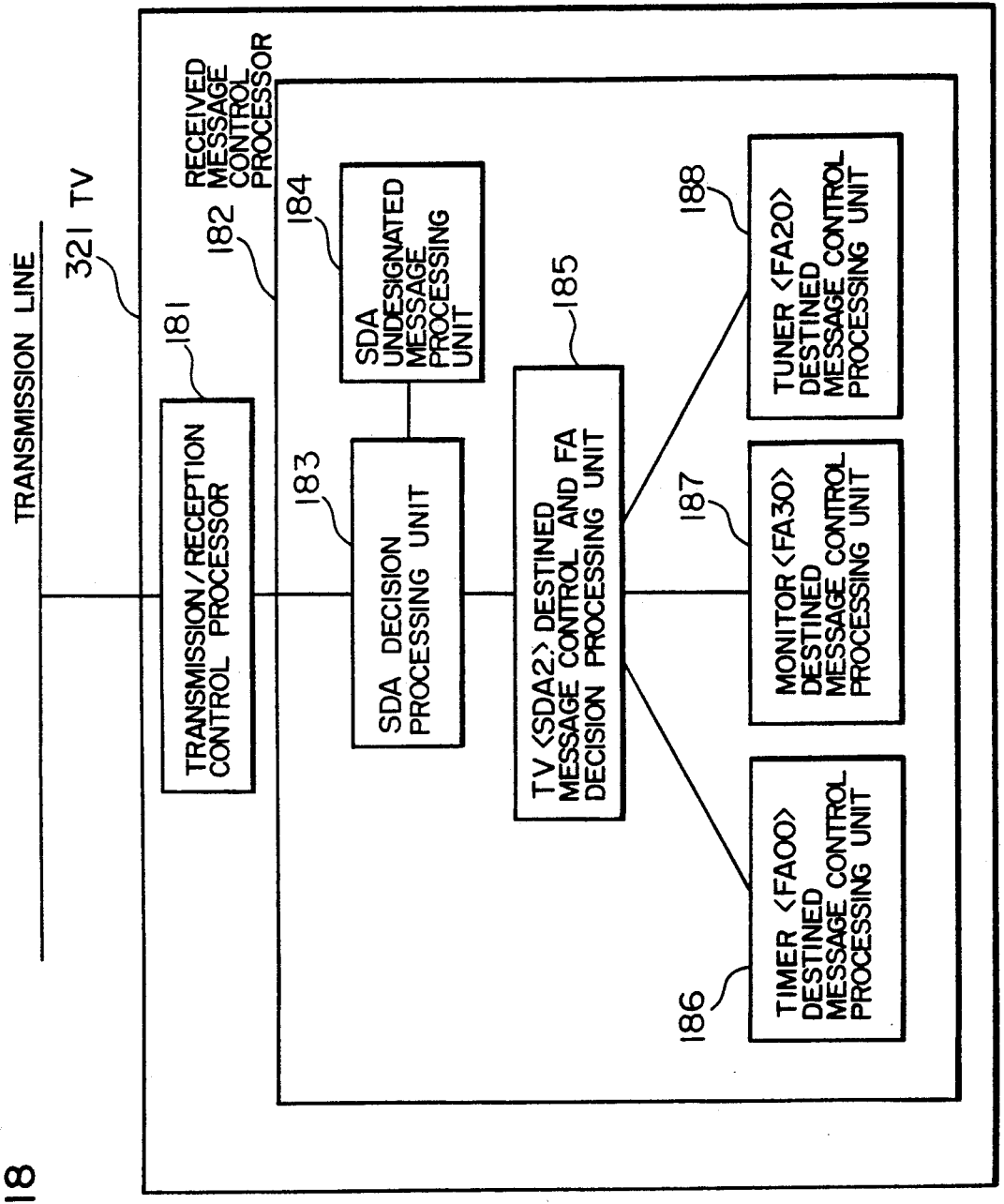
FIG. 18 is a schematic diagram illustrating a received message control processor 182 of TV 11 in accordance with the invention.
Figure 20:
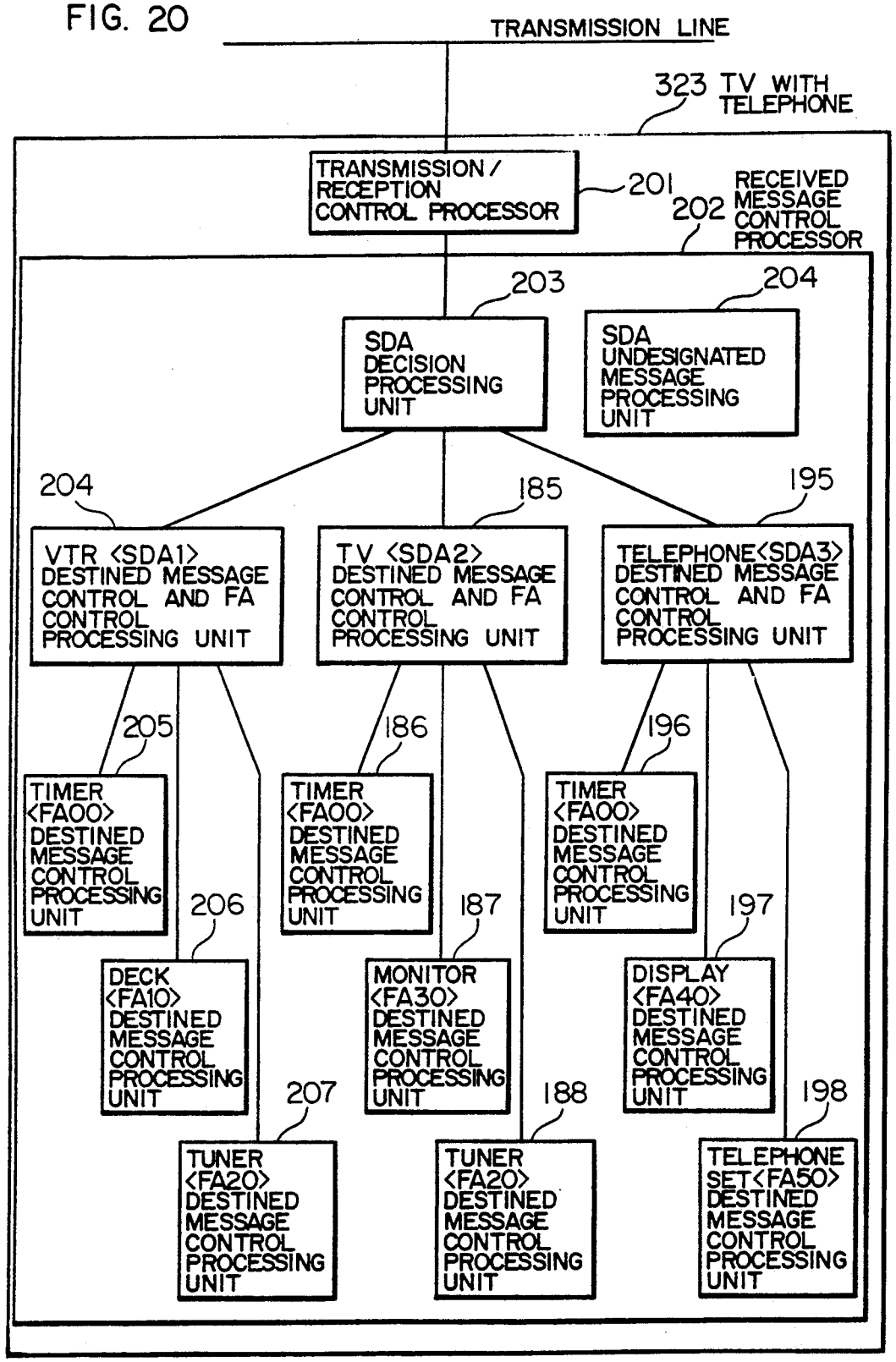
FIG. 20 is a schematic diagram illustrating a received message control processor 202 of TV with telephone 13 in accordance with the invention.

The change of the setting of timer carried out with the prior art as described previously will be done by the present invention as will be described below. In accordance with the invention, the controller 324 can complete the change of setting of timer for the TV of a terminal on the transmission line in accordance with sequence shown in FIG. 16, without resort to the connectable terminal address information holding unit 117 of the prior art controller. As is clear from FIG. 14, the TV 321 and TV with telephone 323 have different DA's but for the SDA and FA desired to be controlled, have the same value of TV <SDA2> and the same value of timer <FA00>. Therefore, the controller 324 builds up a message C as shown in FIG. 16 and transmits the message C on the transmission line by using a simultaneous multi-address, as indicated at 161. In the TV 321 constructed as shown in FIG. 18, a transmission/reception control processor 181 receives the message C and a SDA decision processing unit 183 determines the SDA. Since the SDA in this message C indicates the TV <SDA2>, the SDA decision processing unit 183 actuates a TV <SDA2> destined message control processing unit 185. The <SDA2> destined message control processing unit 185 is also capable of determining the FA. Since the F 154 indicates the timer 173 <FA00>, the <SDA2> destined message control processing unit 185 actuates a timer <FA00> destined message control processing unit 186 to carry out a processing of change of timer. Similarly, in the TV with telephone 323 constructed as shown in FIG. 20, a transmission/reception control processor 201 receives the message C and a SDA decision processing unit 203 decides the SDA. Since the SDA in this message C indicates the TV <SDA2>, the SDA decision processing unit 203 actuates a <SDA2> destined message control processing unit 185. The <SDA2> destined message control processing unit 185 is also operable to decide the FA. Since the F 154 indicates the timer 173 <FA00>, the <SDA2> destined message control processing unit 185 actuates a timer <FA00> destined message control processing unit 186 to processing the change of timer. In this manner according to the invention, the same function of the TV 321 and TV with telephone 323 can be controlled simultaneously and especially when a plurality of terminals are desired to be controlled at a time to effect time correction for timer, the simultaneous control is very effective and complexity in control can be mitigated remarkably.

Figure 19:
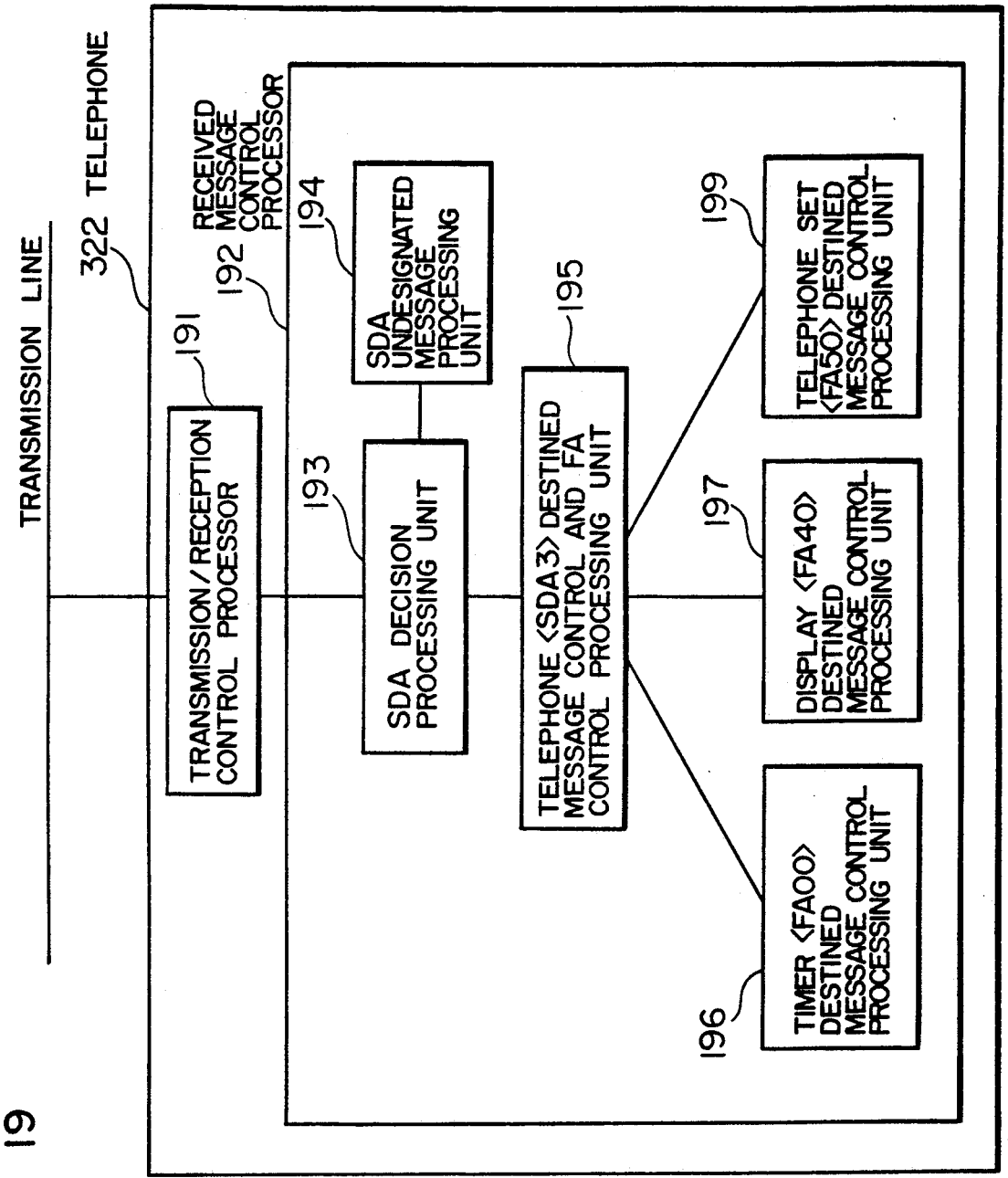
FIG. 19 is a schematic diagram illustrating a received message control processor 192 of telephone 12 in accordance with the invention.

When comparing the TV 321 constructed as shown in FIG. 18 and telephone 322 constructed as shown in FIG. 19 with a received message control processor 202 of the TV with telephone 323 constructed as shown in FIG. 20 and having additional function of VTR, it is clear from FIGS. 18 to 20 that the SDA destined message control processor (FA control processor) of the TV 321 and telephone 322 can be transferred to the TV with telephone 323 without alternation. Thus, the contents of control for existing developed devices can advantageously be utilized without alternation in order to control the terminals of the invention.

Figure 1:
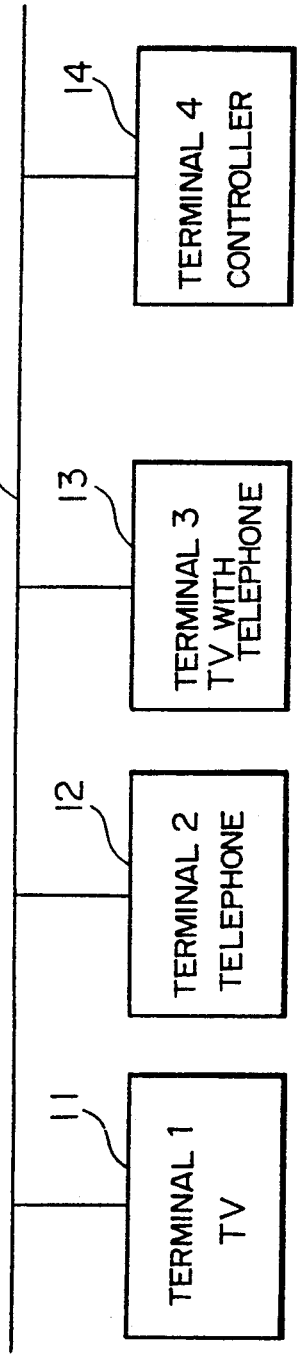
FIG. 1 is a schematic diagram illustrating a communication network to which a transmission system of the invention is applied.
Figure 2:
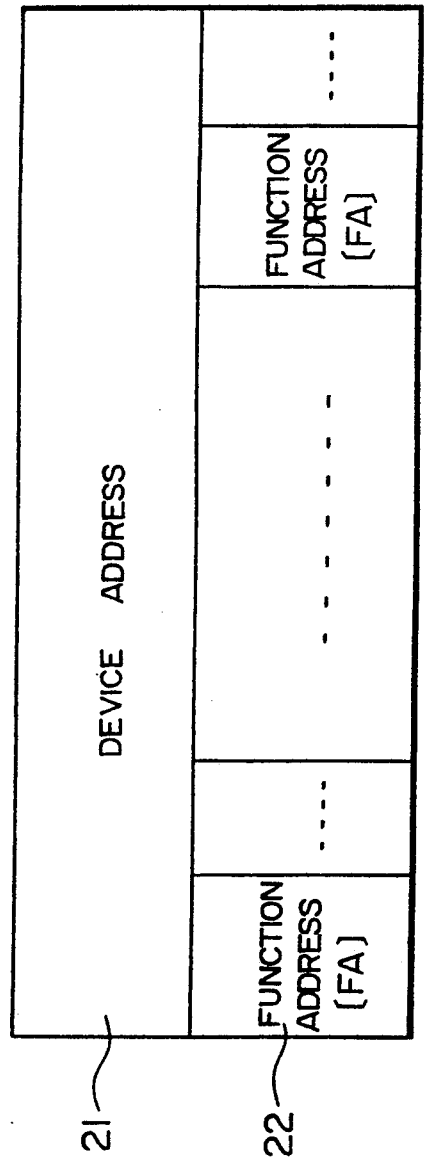
FIG. 2 illustrates a prior art address system for various devices.
Figure 5:
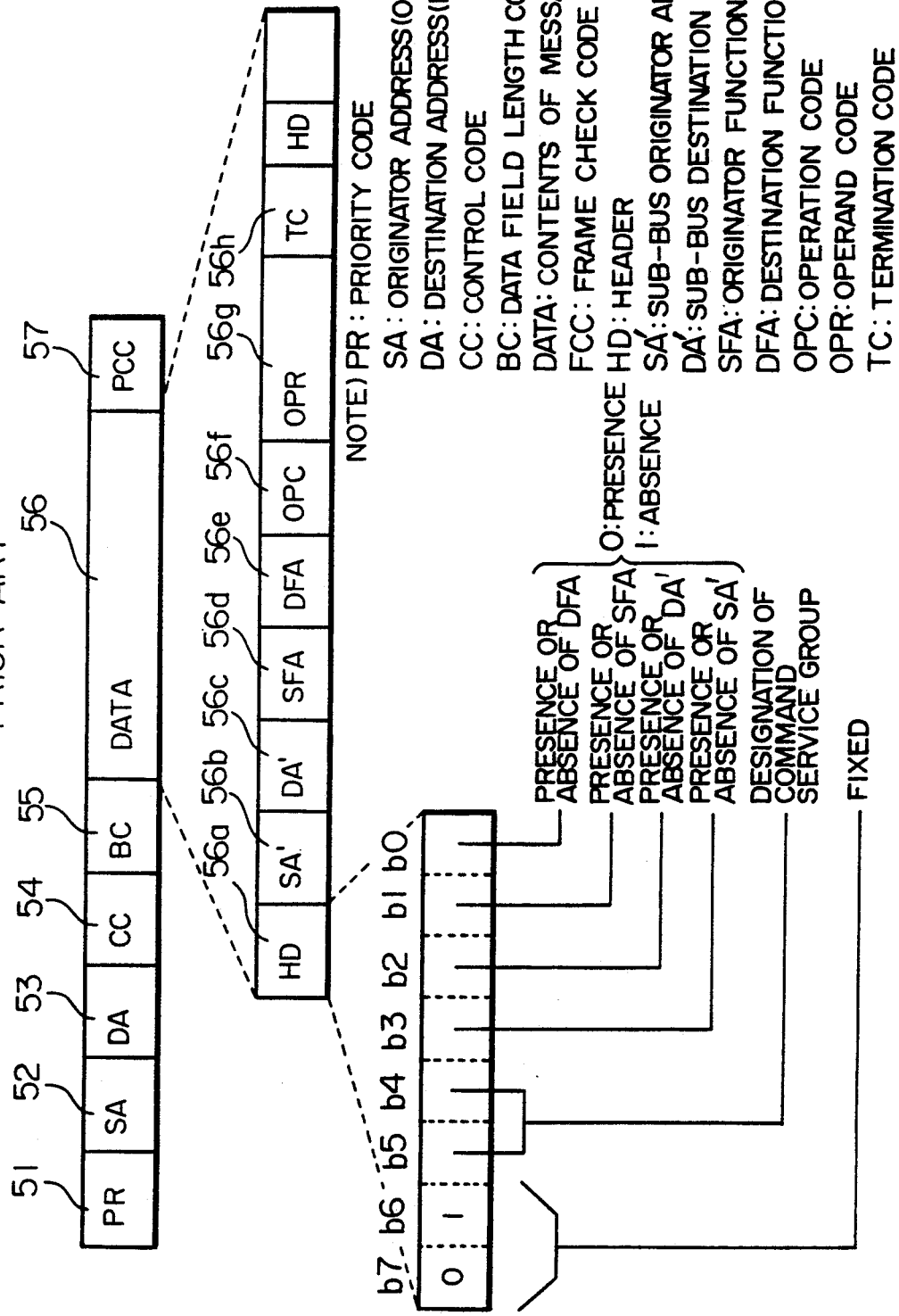
FIG. 5 illustrates a format of a prior art control message on a home bus system control channel.
Figure 6:
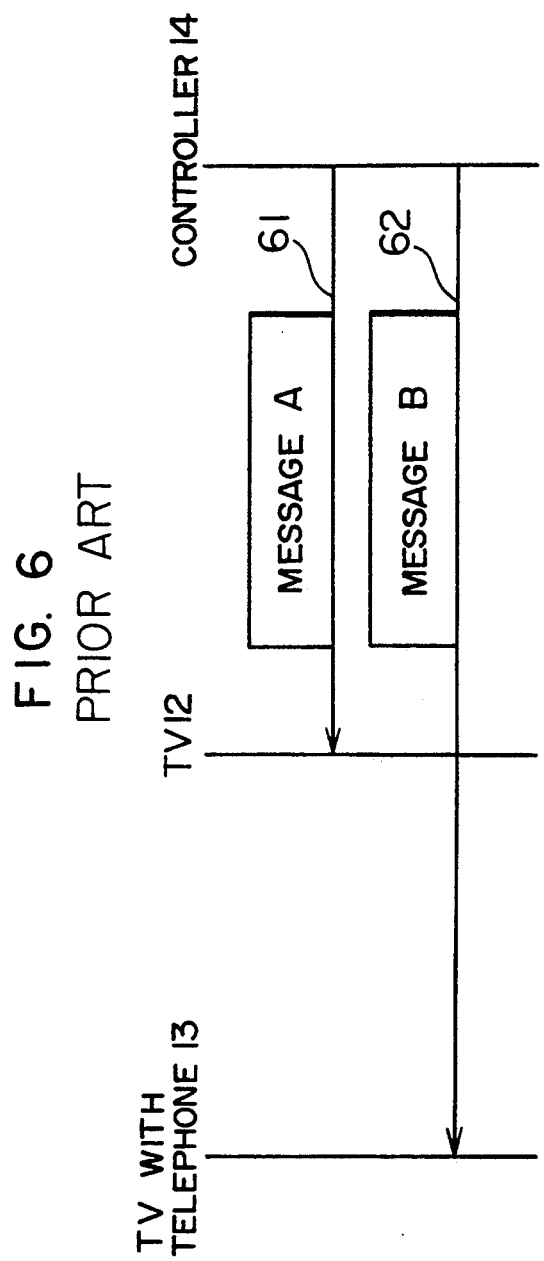
FIG. 6 illustrates an example of sequence for controlling the devices having the address formats shown in FIG. 3.
Figure 7A:
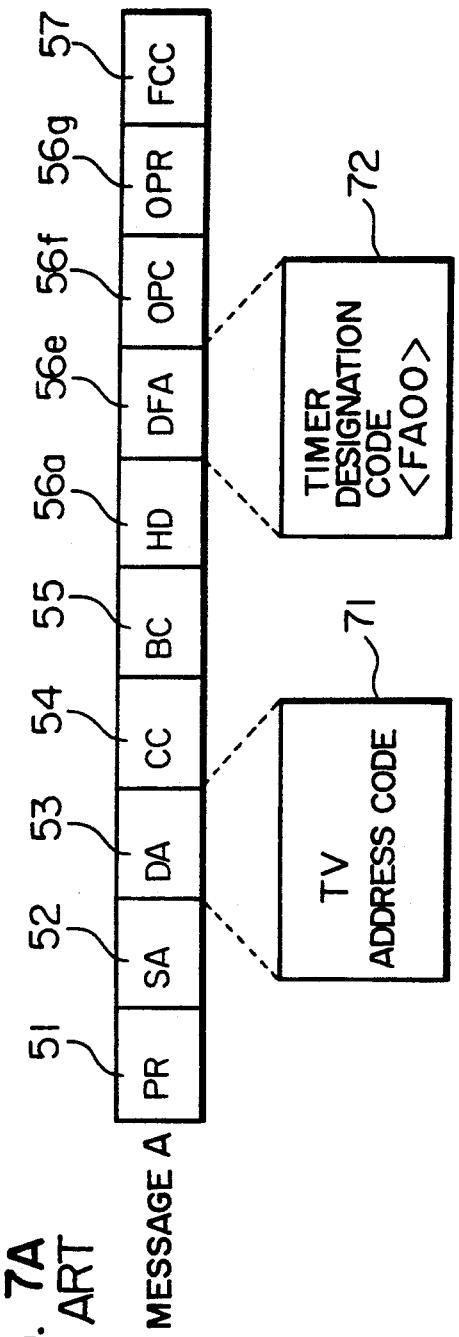
FIGS. 7A and 7B illustrate examples of a message format used in the sequence shown in FIG. 6.
Figure 7B:
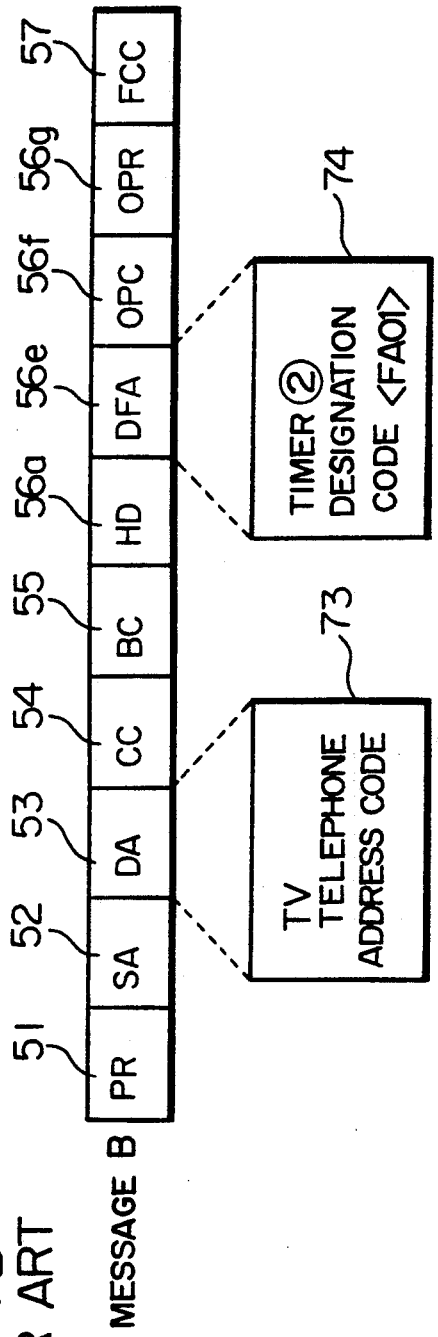
Figure 8:
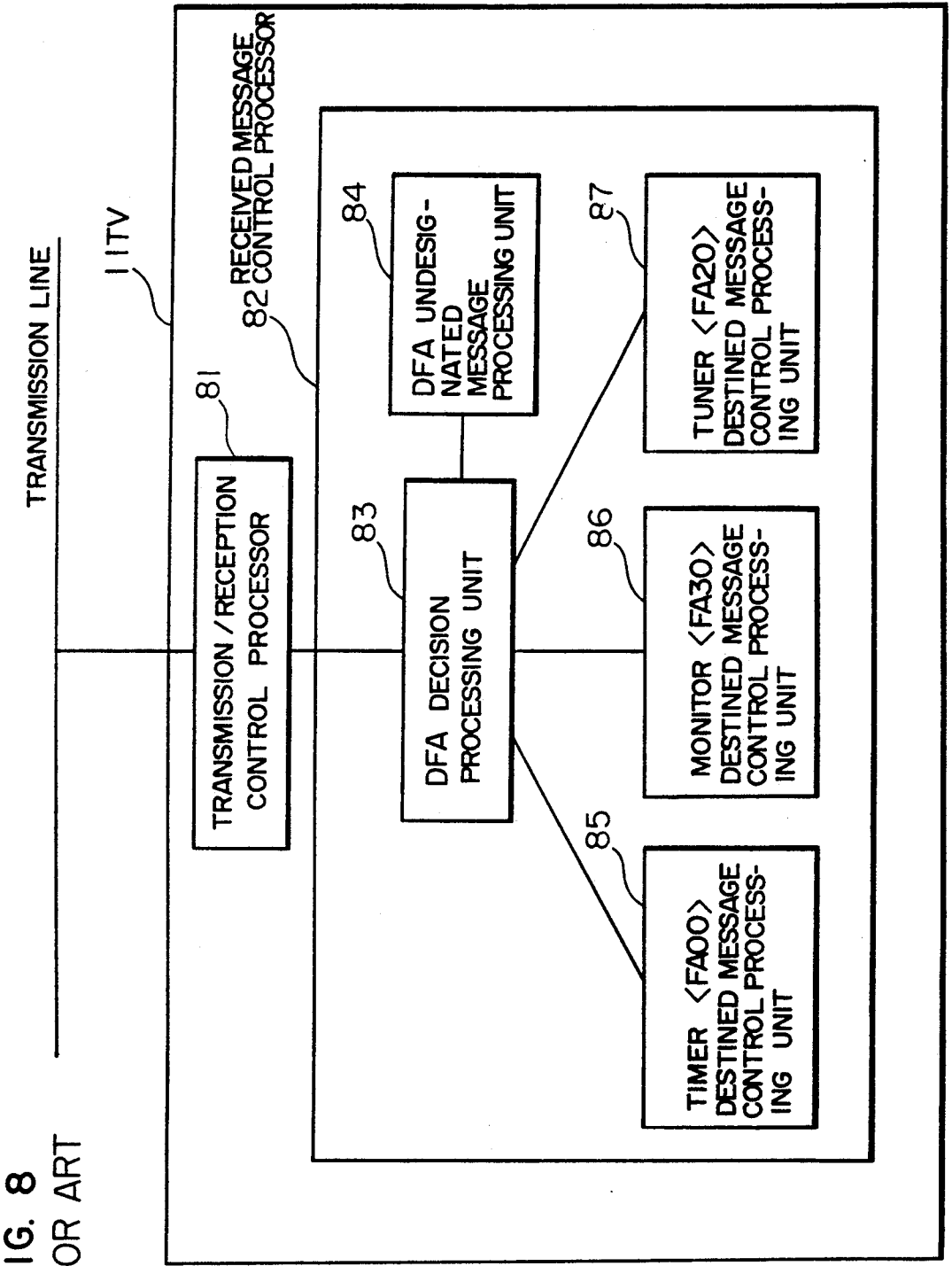
FIG. 8 is a schematic diagram illustrating a prior art received message processor for a TV.
Figure 9:
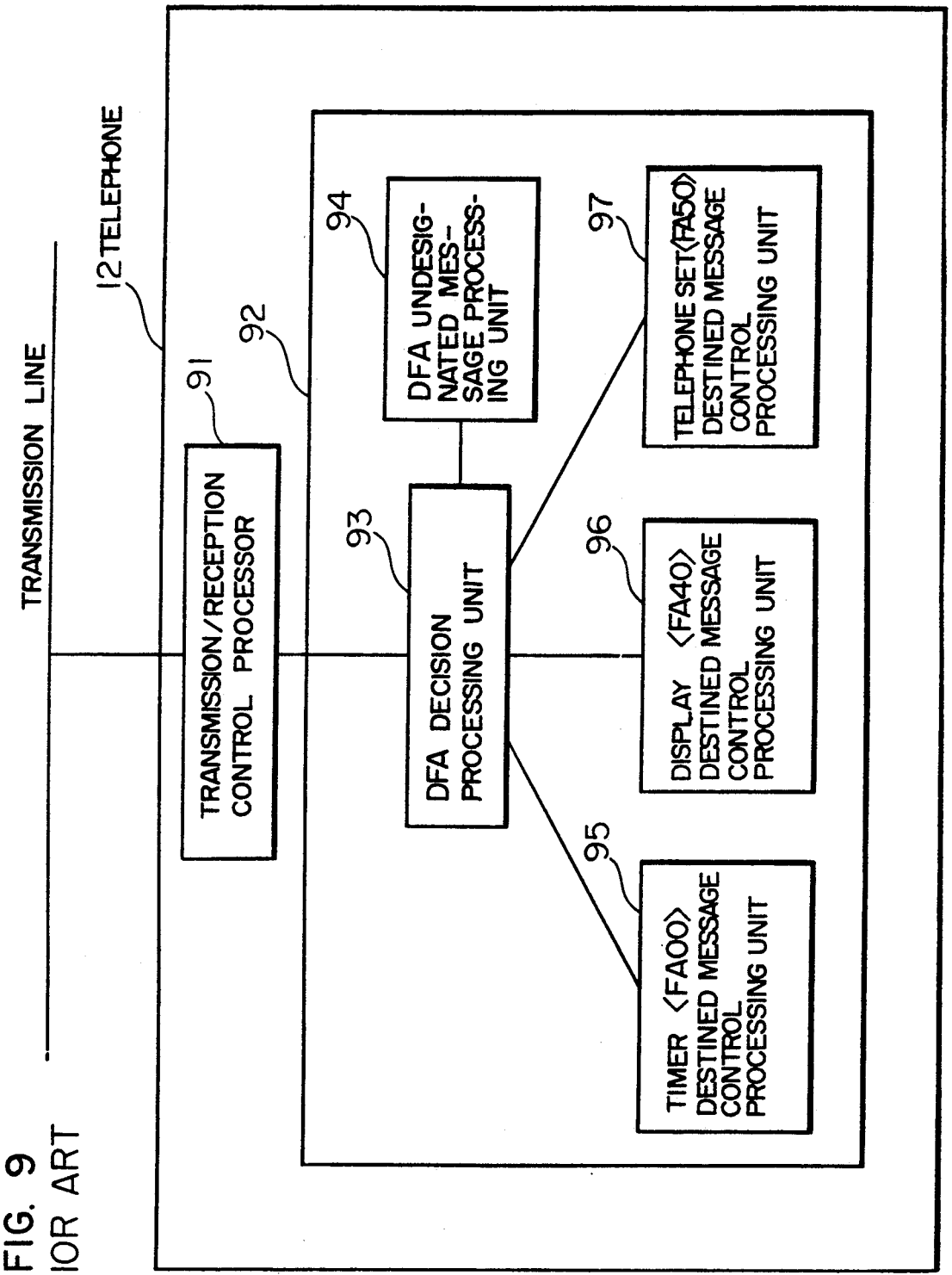
FIG. 9 is a schematic diagram illustrating a prior art received message processor for a telephone.
Figure 10:
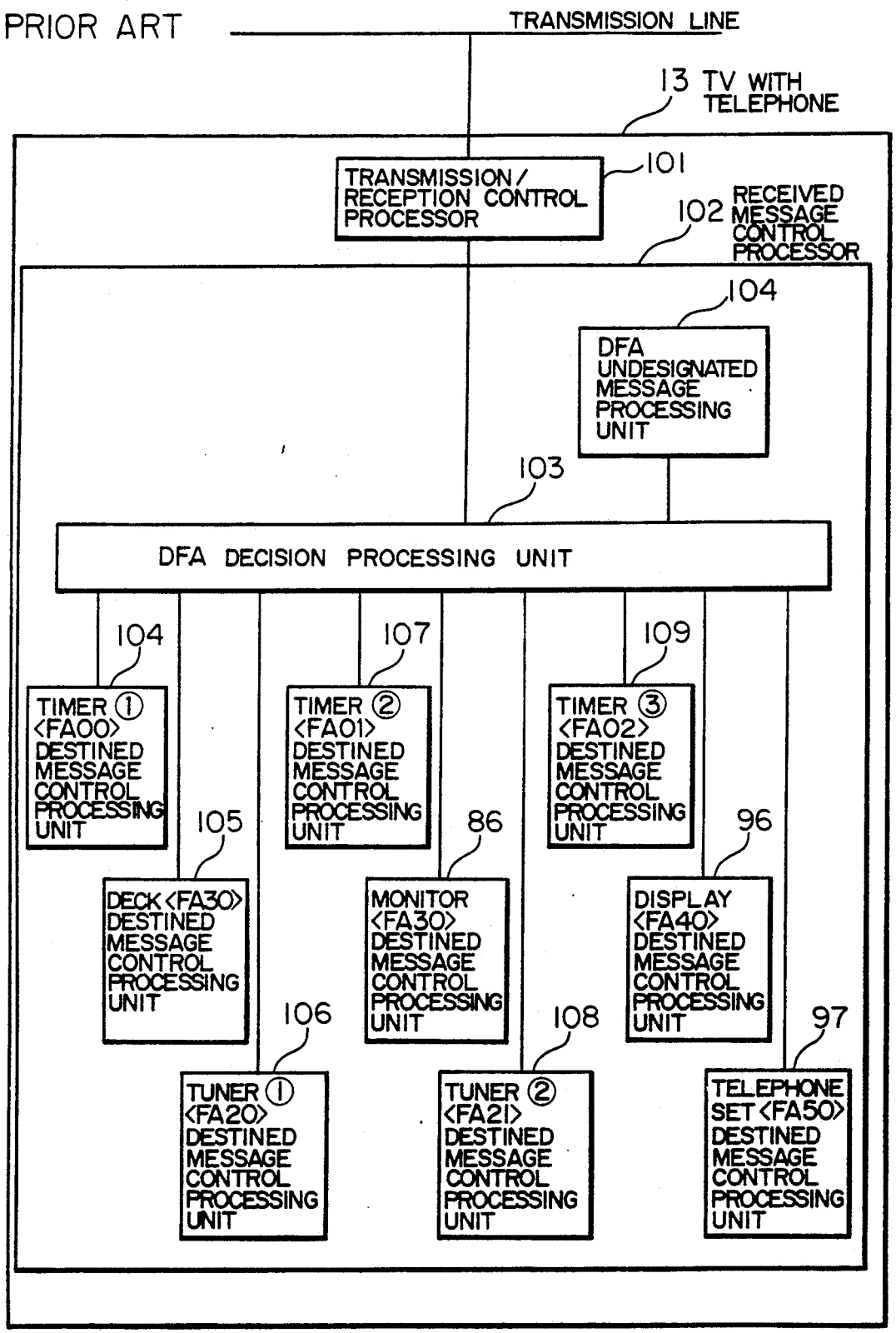
FIG. 10 is a schematic diagram illustrating a prior art received message processor of a TV with telephone.
Figure 11:
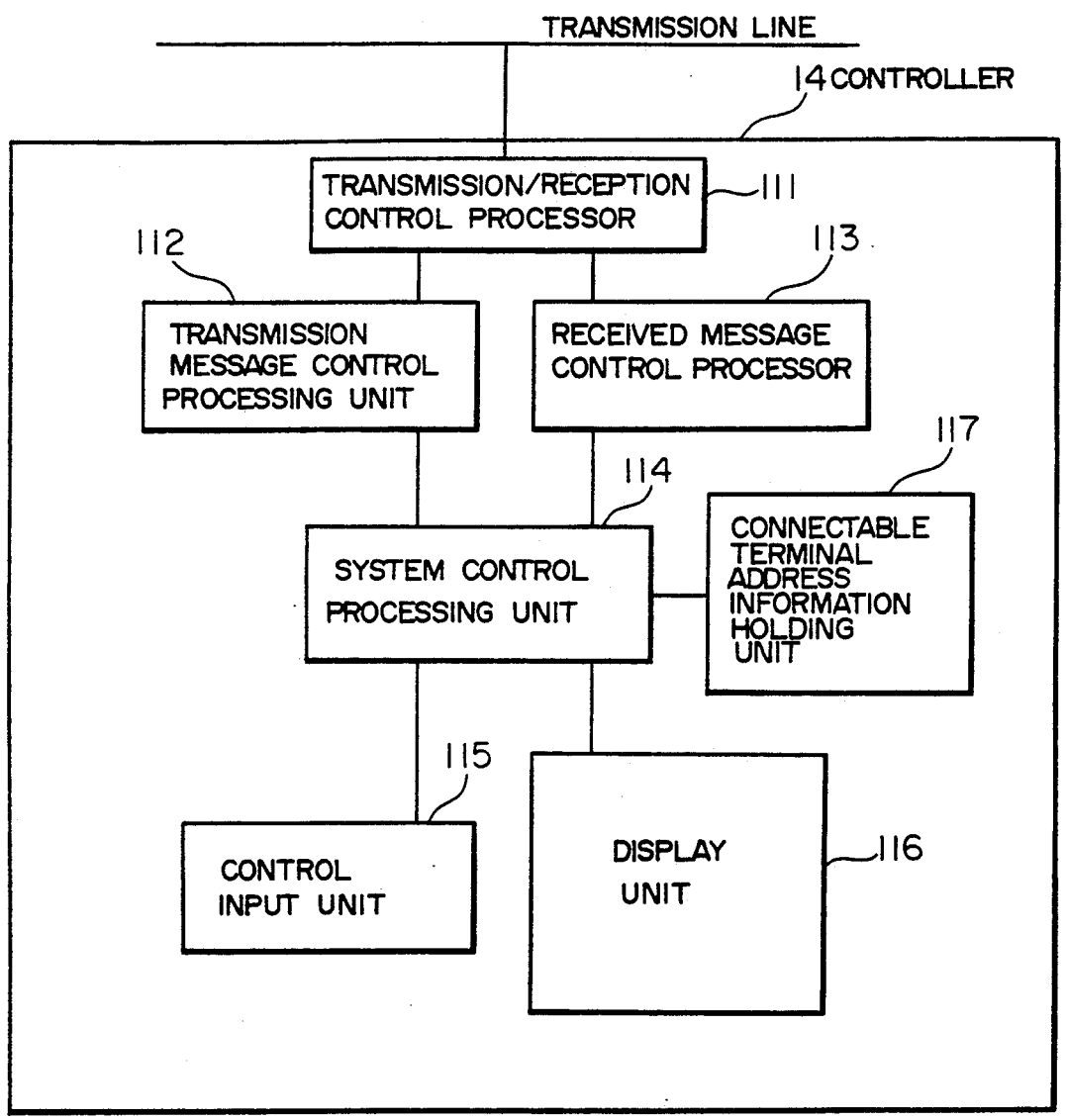
FIG. 11 is a schematic diagram illustrating a prior art controller.
Figure 21:
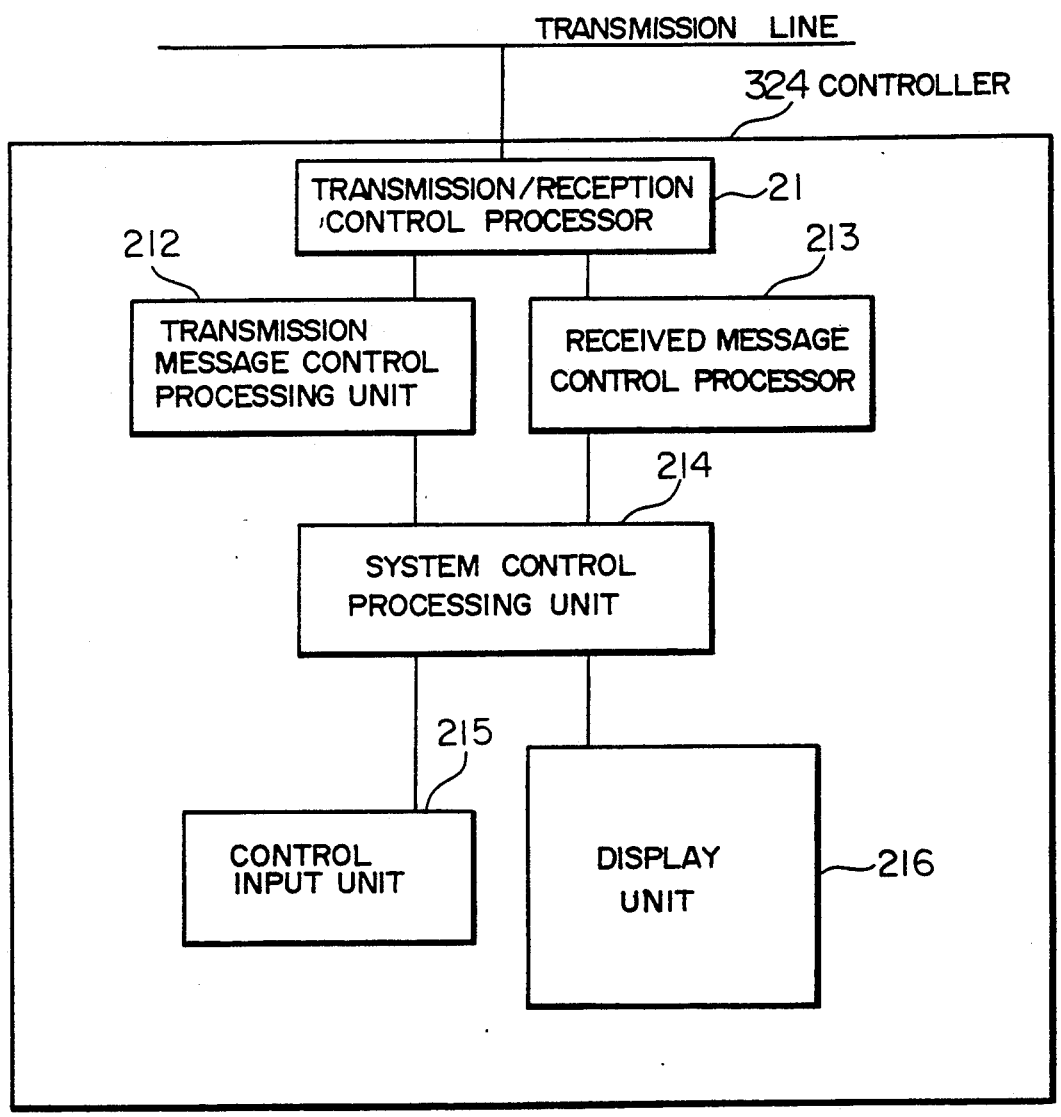
FIG. 21 is a schematic diagram illustrating a controller in accordance with the invention.
Figure 24:
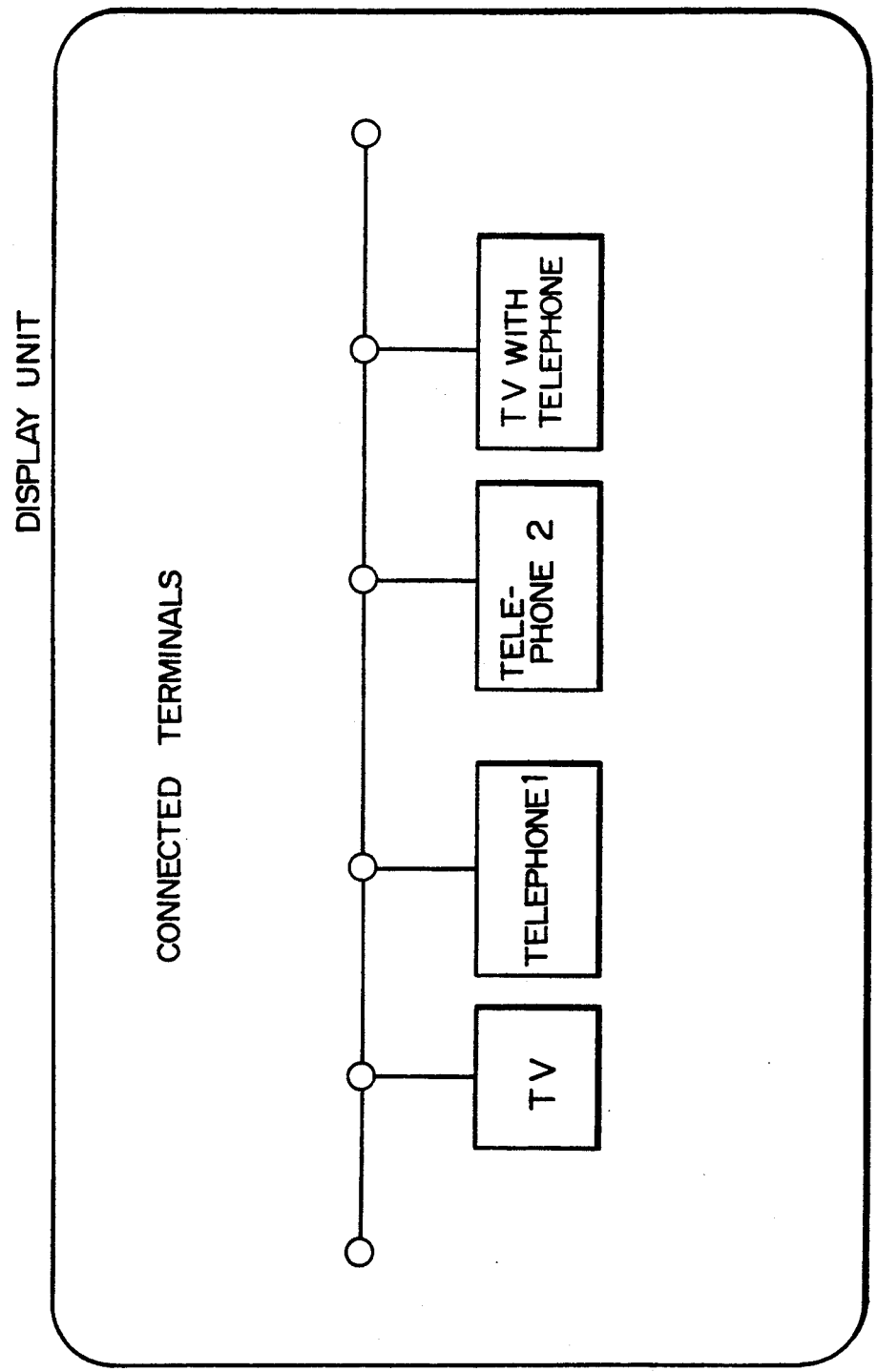
FIGS. 24 and 25 are diagrams illustrating examples of DA information displayed on a display unit of the controller 14.
Figure 25:
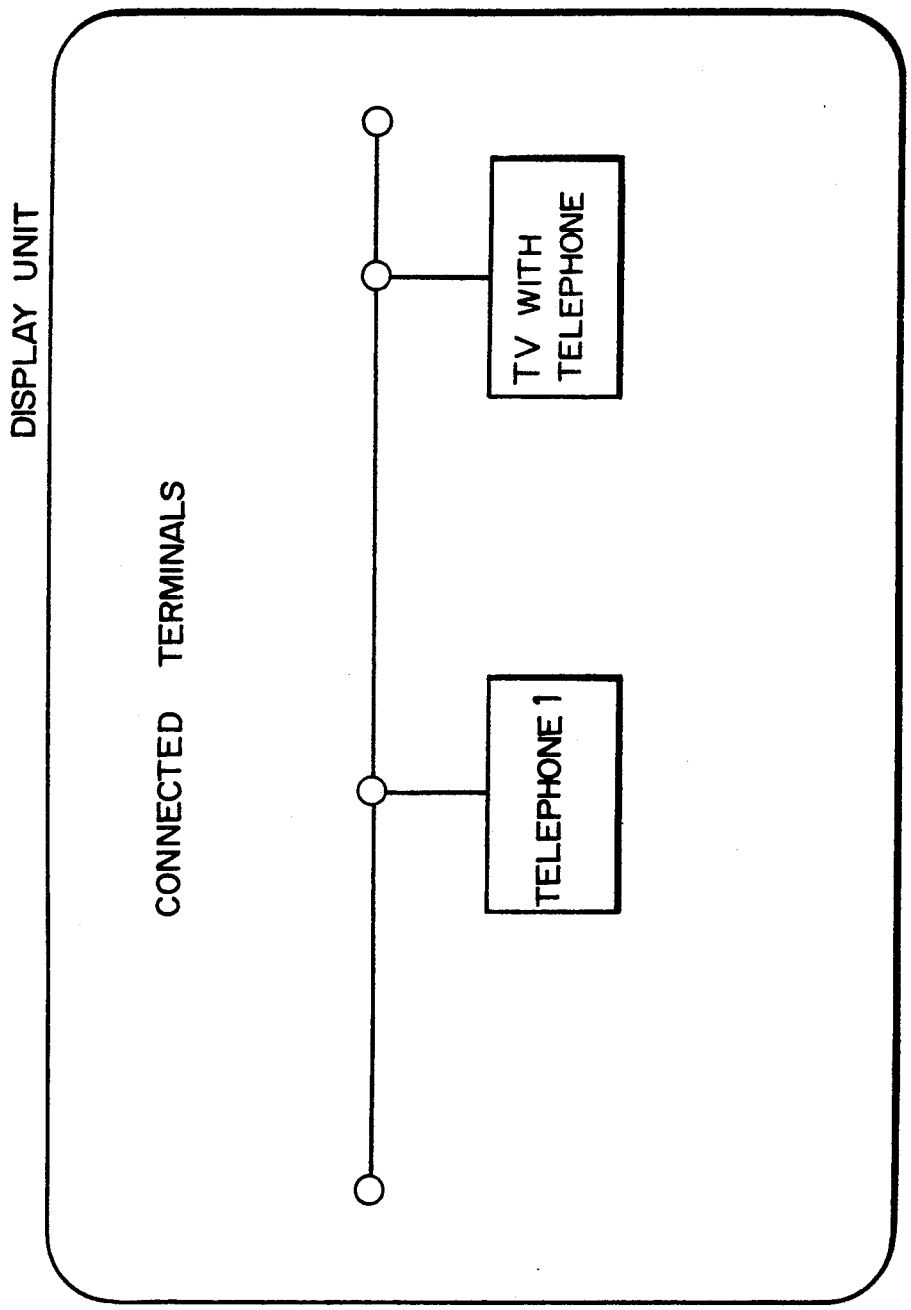
Figure 26A:
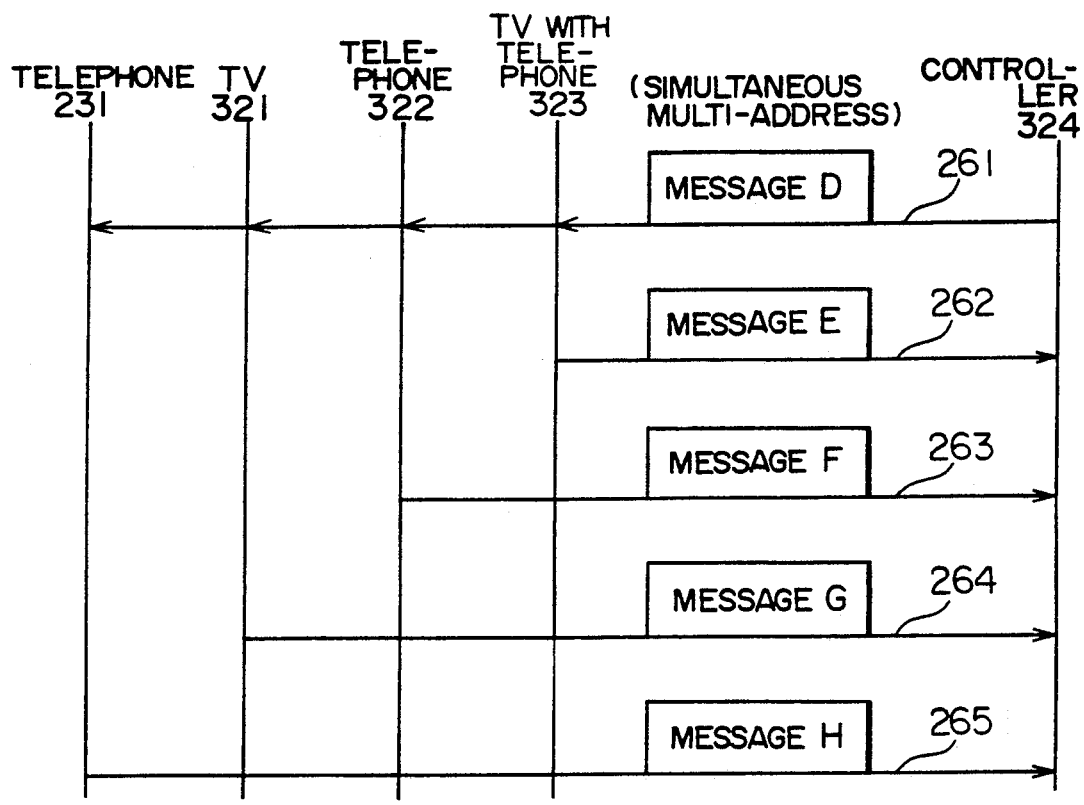
FIGS. 26A and 26B illustrate examples of sequence for information collection in accordance with the invention which are adapted to create the display shown in FIGS. 24 and 25.
Figure 26B:
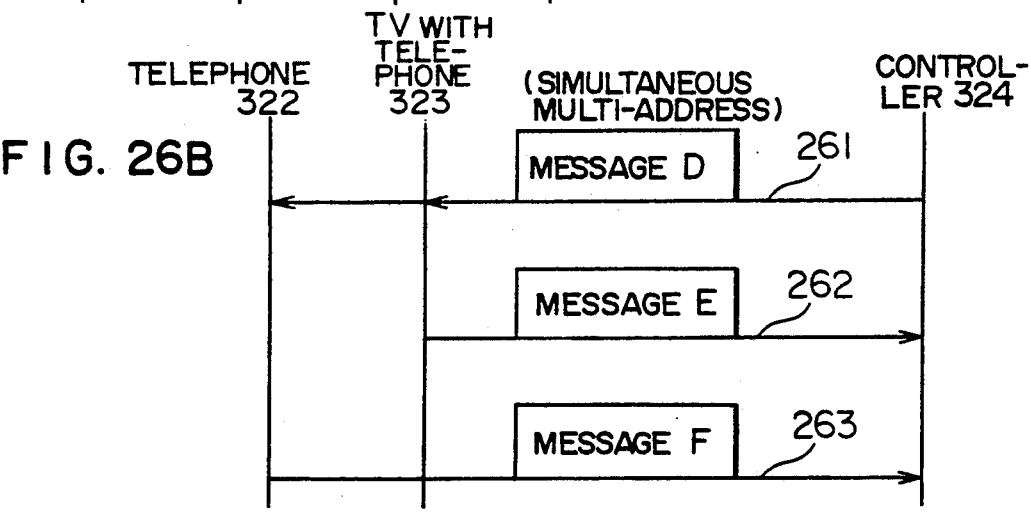
Figure 28:
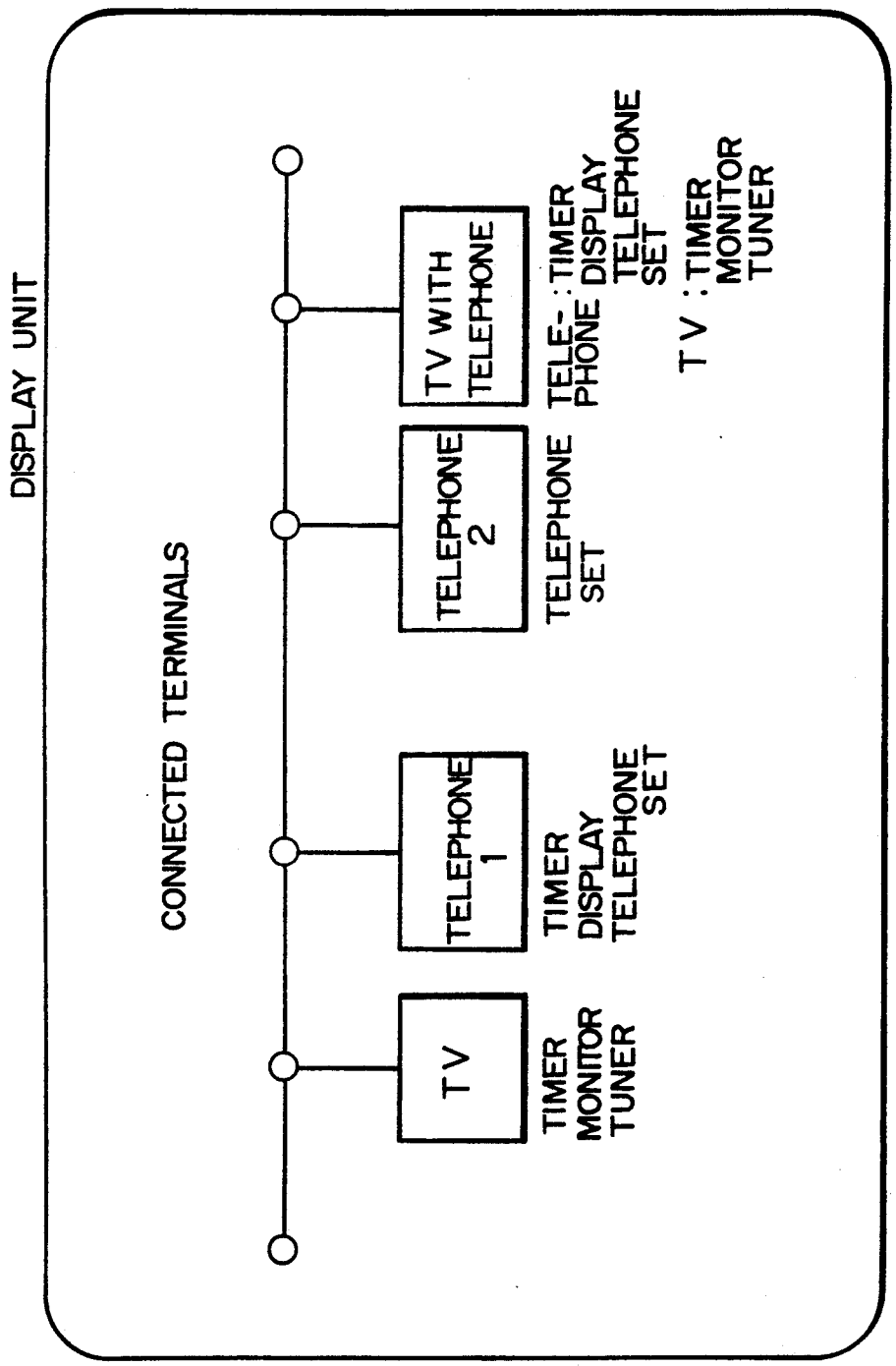
FIG. 28 is a diagram illustrating an example of FA information displayed on the display unit of the controller 14.
Figure 29:
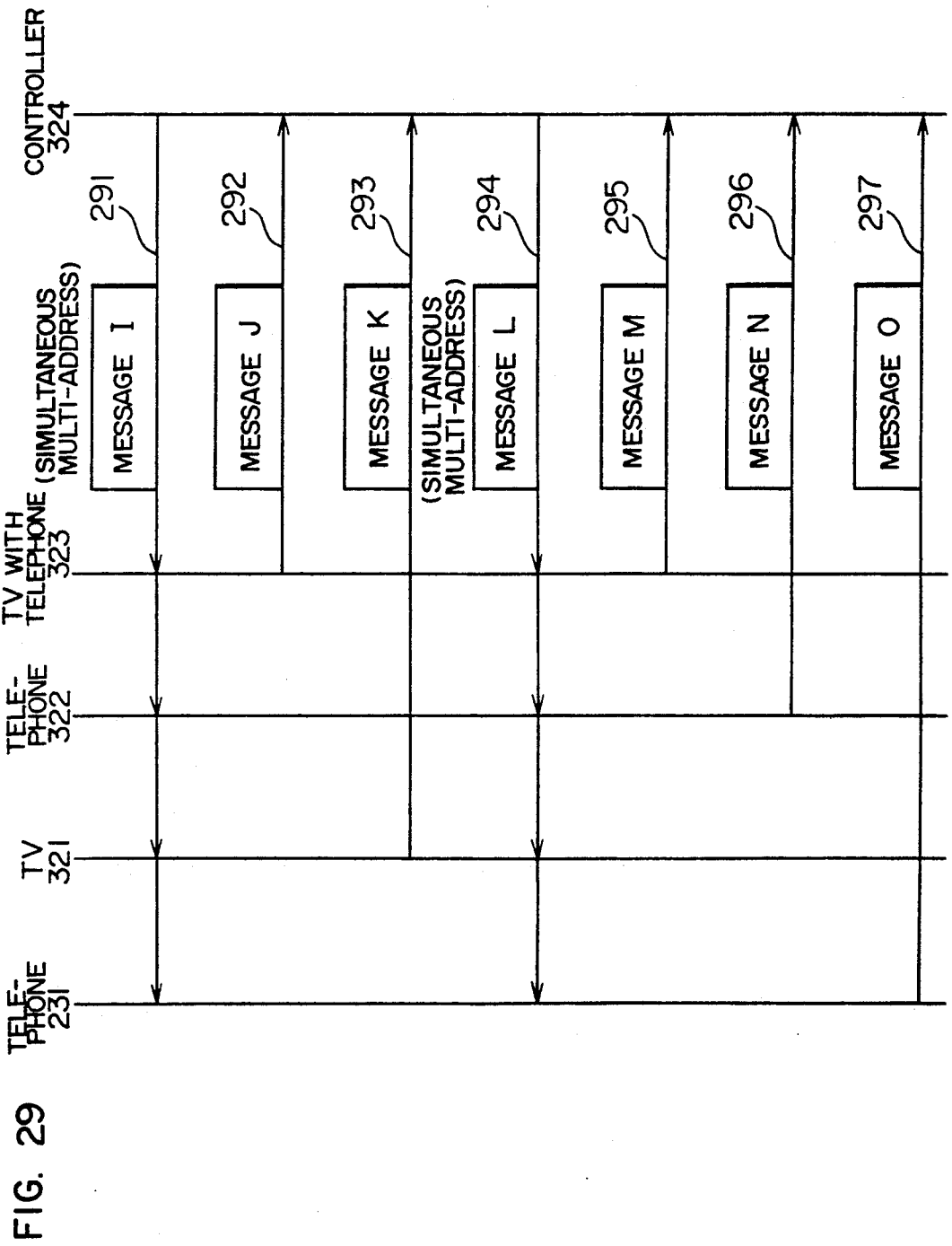
FIG. 29 illustrates an example of the sequence for information collection in accordance with the invention which is adapted to create the display shown in FIG. 28.

The controller 324 according to the invention is constructed as shown in FIG. 21 wherein the connectable device address information holding unit 117 of the prior art controller shown in FIG. 11 can be eliminated. However, with the controller 324 having the construction shown in FIG. 21, however, and when information about SDA's of connectable terminals is desired to be displayed on a display unit 216 in a manner as shown in FIG. 24, the controller 324 has to know the terminal information in some form. Accordingly, commands for collecting information about SDA and FA are introduced as shown in FIG. 22. Then, a SDA undesignated message processing unit of each terminal has a SDA request command processor which, upon receipt of a message due to a SDA request command 221, returns a message due to a SDA response command 222, and the SDA destined message control processing unit of each terminal has a FA request command processor which, upon receipt of a message due to a FA request command 223, returns a message due to a FA response command 224. According to the invention, even when a telephone 231 is newly added to the FIG. 1 system to construct a method and an apparatus as shown in FIG. 23, the information can be collected and displayed in accordance with the sequence as shown in FIG. 26 without requiring the additional steps as in the prior art, and pieces of the information can be registered in the connectable terminal address information holding unit 117 of the controller 324. More particularly, the controller 324 builds up a message D 271 due to the SDA request command 221 as shown in FIG. 27 and transmits the message D onto the transmission line by using a simultaneous multi-address, as indicated at 261 in FIG. 26. All the terminals on the transmission line build up messages E 272, F 273, G 274 and H 275 which are due to the SDA response command 222 and return these messages to the controller 324 in accordance with the communication scheme of the transmission line, as indicated at 262, 263, 264 and 265 in FIG. 26.

Figure 30:
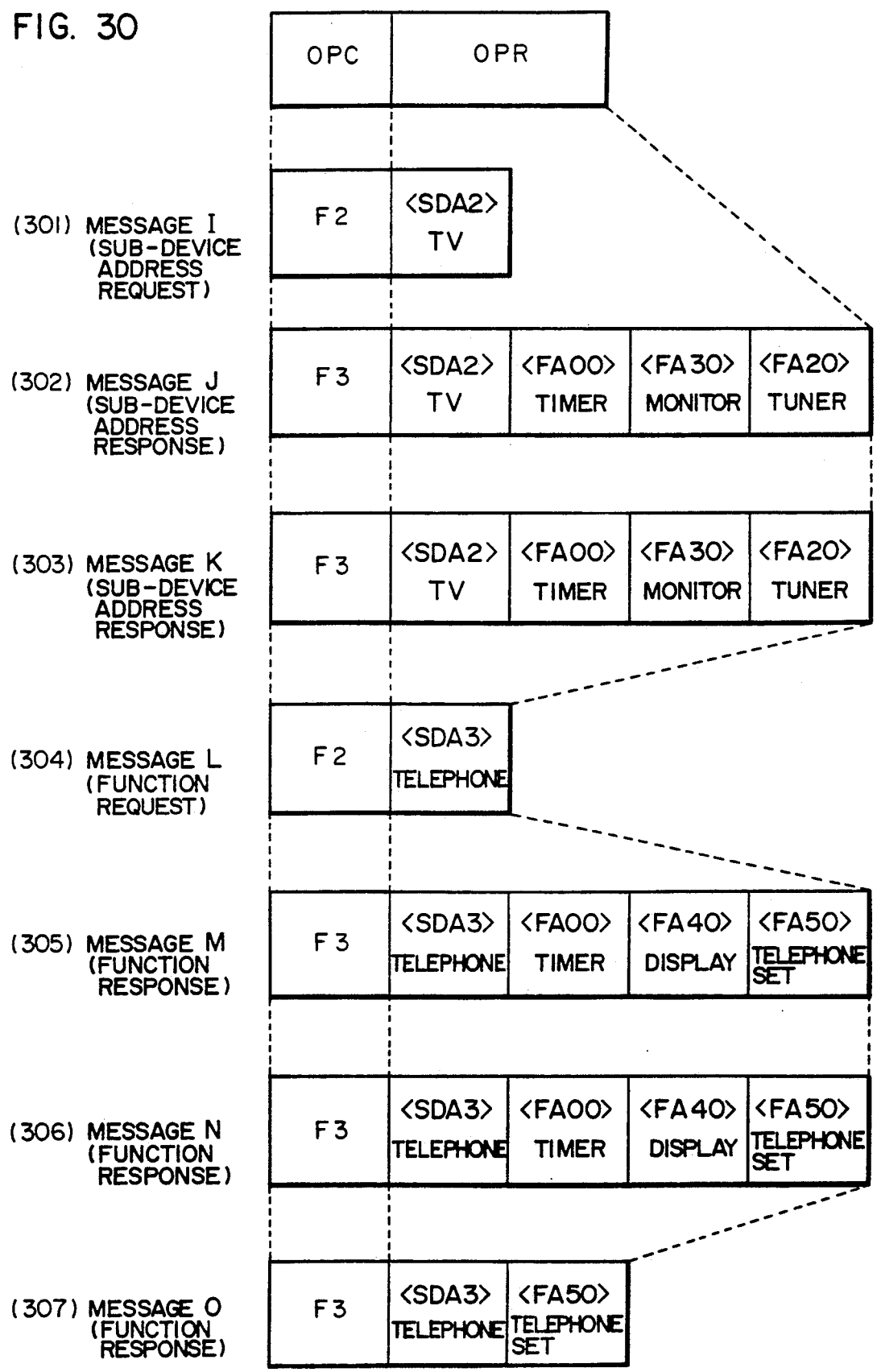
FIG. 30 illustrates examples of command format in message used for execution of the sequence shown in FIG. 29.

The controller 324 responds to the returned information to perform display of FIG. 24. For example, when the TV 321 and telephone 322 are disconnected from the transmission line as indicated at CASE 2 in FIG. 26, the command can be effectively used to cause the controller to respond to the latest information so as to create the display. In another example shown in FIG. 28, FA information possessed by, for example, the TV and telephone standing for the SDA is displayed using the command as will be described below. After completion of the information collection processing shown in FIG. 26, the controller 14 transmits a message I 301, as shown in FIG. 30, containing a FA request command 223 possessed by the SDA of TV by using a simultaneous multi-address, as indicated at 291 in FIG. 29. This causes the devices TV 321 and TV with telephone 323 each having the TV as the SDA to return messages due to a FA response command 224 as messages J 302 and K 303, respectively, as indicated at 292 and 293 in FIG. 29. Subsequently, the controller 324 transmits a message L 304 containing a FA request command 223 possessed by the SDA of telephone by using a simultaneous multi-address, as indicated at 294 in FIG. 29. This causes the terminals telephone 322, telephone 231 and TV with telephone 323 each having the telephone as the SDA to return messages due to a FA response command 224 as messages N 306, O 307 and M 305, respectively, as indicated at 296, 297 and 295 in FIG. 29.

Figure 31:
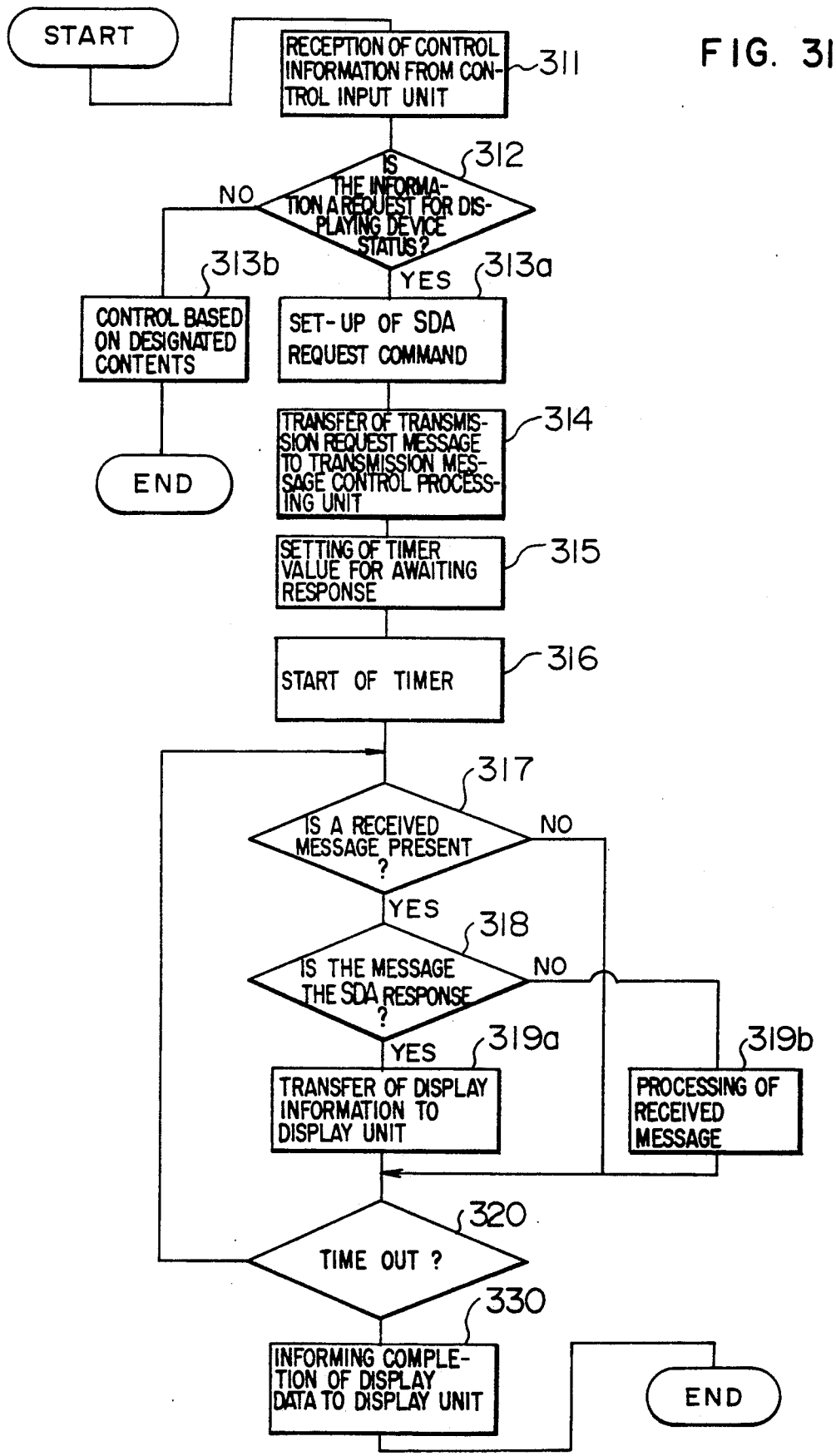
FIG. 31 is a flow chart useful for explaining the operation for display of the device status on the display unit.

At that time, the system control processing unit 214 of the controller 324 according to the invention can cause microcomputer to perform, for example, a processing as will be described below with reference to FIG. 31. When receiving control information from the control input unit 215 in step 311, the system control processing unit 214 of the controller 324 determines in step 312 whether the information is a request for displaying device status. If "NO", the procedure proceeds to step 313b where control based on designated contents is carried out. If "YES", the procedure proceeds as follows. First, a message due to the SDA request command is set up in step 313a, and this message is then transferred as a transmission request signal to the transmission message control processing unit 212 in step 314. A timer value for awaiting reception of a message due to the SDA response command is set in step 315, and the time is started in step 316. After start of the timer, the following processing is repeated until the set timer value expires. More particularly, the presence of a message from the received message control processing unit 212 is first determined in 317. If the answer is "NO", the procedure proceeds to step 320 where the expiration of the set timer value is checked and if the answer is "YES", the procedure continues to step 318 where it is decided whether the message is due to the SDA response command. If the answer from step 318 is "NO", processing pursuant to the contents of the received message is carried out in step 319b and if "YES", display information prepared in accordance with the contents of the SDA response command is transferred to the display unit 216 in step 319a and thereafter the expiration of the set timer value is checked in step 320. The above steps 317 to 319 are repeated until the set timer value expires and at the expiration of the set timer value, completion of display data is sent to the display unit in step 330 and the inputted control processing ends. Using the collected information, the display of FIG. 28 can be effected.

As described above, according to the invention, the controller 324 can access a specific address system for terminals at a time point after installation of the terminals to facilitate control of individual functions of the terminals and to grasp the construction of the overall apparatus and method, thereby improving extensibility of the apparatus and the method of control and service.

This invention is not to be limited by the embodiments shown in the drawings and described in the description, which are given by way of example and not of limitation, but only in accordance with the scope of the appended claims.

I claim:

1. A terminal control method for controlling a plurality of terminals on a communication network which are connectable to a common transmission line and which have the capability of transmitting/receiving a control message to communicate with one another and each of which includes a single device or a composite device comprising a plurality of devices, wherein transmission and reception of messages to and from said plurality of terminals on said communication network is performed using an address code assigned to each terminal, said address code comprising a different device address or DA assigned to each of the respective individual terminals, a different sub-device address or SDA assigned to each of the respective devices constituting each terminal, each address code having a single or a plurality of values of SDA depending upon whether the associated terminal includes a single device or a composite device, and a different function address or FA assigned to each respective function possessed by each device, each address code having a single or a plurality of values of FA.

2. A terminal control method according to claim 1 wherein at least one of said terminals includes a command system to collect information as to a said address code possessed by another one of said terminals connectable to said transmission line, said command system comprising an SDA request command for collecting information about SDA's of the respective devices constituting said another one of said terminals, an SDA response command indicative of a response to a said SDA request command, an FA request command for collecting information about FA's of functions of said respective devices of said another one of said terminals, and an FA response command indicative of a response to a said FA request command, each of said SDA and FA response commands having an operation code part indicative of the contents of the response to the respective SDA or FA request command and an operand part containing information about the respective SDA or FA.

3. A communication apparatus having a plurality of terminals on a communication network which are connectable to a transmission line to communicate with one another and each of which includes a single device or a composite device comprising a plurality of devices, wherein each terminal is assigned with an address code used for transmission and reception of messages to and from said plurality of terminals on said communication network, said address code comprising a different device address or DA assigned to each of the respective individual terminals, a different sub-device address or SDA assigned to each of the respective devices constituting each terminal and a different function address or FA assigned to each respective function possessed by each device, and wherein each terminal comprises a transmission/reception control processor and a received message control processor including an SDA decision processing unit, at least one FA decision processing unit and at least one FA destined message control processing unit, said transmission/reception control processor being operable to (i) detect and compare a DA in a message on said transmission line with a DA of its own terminal and (ii) upon occurrence of coincidence thereof, transfer the received message to said received message control processor, said SDA decision processing unit being operable to (i) detect and compare an SDA in the message received from said transmission/reception control processor with its own SDA and (ii) transfer the message to said FA decision processing unit, said FA decision processing unit being operable to detect and compare an FA in the message received from said SDA decision processing unit with its own FA and transfer the message to a designated FA destined message control processing unit, said designated FA destined message control processing unit being operable to analyze the message received from said FA decision processing unit.

* * * * *